(12) United States Patent
Canli et al.

(10) Patent No.: US 11,535,375 B2
(45) Date of Patent: Dec. 27, 2022

(54) AUTONOMOUS UNMANNED AERIAL VEHICLE

(71) Applicants: ISTANBUL TEKNIK UNIVERSITESI, Istanbul (TR); MITOS MIKRODALGA GORUNTULEME SISTEMLERI MUHENDISLIK SANAYI VE TICARET LIMITED SIRKETI, Istanbul (TR)

(72) Inventors: Guray Ali Canli, Istanbul (TR); Ibrahim Akduman, Istanbul (TR); Ismail Kurtoglu, Istanbul (TR); Mehmet Cayoren, Istanbul (TR); Pelin Yavuz Gundogdu, Istanbul (TR); Ibrahim Ozkol, Istanbul (TR); Hasan Ercan, Istanbul (TR); Muhammet Tarik Tamyurek, Eskisehir (TR)

(73) Assignees: ISTANBUL TEKNIK UNIVERSITESI, Istanbul (TR); MITOS MIKRODALGA GORUN IULEME SISTEMLER: MUHENDISLHK SANAYI VE TICARET LIMITED SIRKETI, Istanbul (TR)

( * ) Notice: Subject to any disclaimer, the term of this patent is extended or adjusted under 35 U.S.C. 154(b) by 435 days.

(21) Appl. No.: 16/628,731

(22) PCT Filed: Jul. 6, 2018

(86) PCT No.: PCT/TR2018/050352
§ 371 (c)(1),
(2) Date: Jan. 6, 2020

(87) PCT Pub. No.: WO2019/147196
PCT Pub. Date: Aug. 1, 2019

(65) Prior Publication Data
US 2020/0283142 A1 Sep. 10, 2020

(30) Foreign Application Priority Data

Jul. 6, 2017 (TR) .................................. 2017/10000
Jul. 6, 2018 (TR) .................................. 2018/09680

(51) Int. Cl.
*B64C 29/02* (2006.01)
*B64D 27/02* (2006.01)
(Continued)

(52) U.S. Cl.
CPC .............. *B64C 39/024* (2013.01); *B64B 1/40* (2013.01); *B64B 1/58* (2013.01); *B64C 3/10* (2013.01);
(Continued)

(58) Field of Classification Search
None
See application file for complete search history.

(56) References Cited

U.S. PATENT DOCUMENTS 4,693,813 A * 9/1987 Takeshita ............... B23D 37/22
29/889.2
5,516,060 A 5/1996 McDonnell
(Continued)

FOREIGN PATENT DOCUMENTS

CN 106741902 A * 5/2017
JP 2017061174 A 3/2017
(Continued)

*Primary Examiner* — Christopher P Ellis
(74) *Attorney, Agent, or Firm* — Bayramoglu Law Offices LLC

(57) ABSTRACT

An autonomous unmanned aerial vehicle for land, sea and air use. The autonomous unmanned aerial vehicle is more specifically related to an unmanned aerial vehicle, wherein the autonomous unmanned aerial vehicle is configured to
(Continued)

vertically take off and vertically land, fly with fixed wings and stay in the air silently for a long time by means of a balloon inflated behind it.

16 Claims, 25 Drawing Sheets

(51) Int. Cl.
| | |
|---|---|
| *B64C 39/02* | (2006.01) |
| *B64B 1/40* | (2006.01) |
| *B64B 1/58* | (2006.01) |
| *B64C 3/38* | (2006.01) |
| *B64C 5/00* | (2006.01) |
| *B64C 19/00* | (2006.01) |
| *B64C 39/08* | (2006.01) |
| *B64D 27/04* | (2006.01) |
| *B64D 27/24* | (2006.01) |
| *B64D 35/04* | (2006.01) |
| *B64C 3/10* | (2006.01) |
| *B64C 3/16* | (2006.01) |
| *B64C 17/06* | (2006.01) |

(52) U.S. Cl.
CPC ............... *B64C 3/16* (2013.01); *B64C 3/38* (2013.01); *B64C 5/00* (2013.01); *B64C 17/06* (2013.01); *B64C 19/00* (2013.01); *B64C 29/02* (2013.01); *B64C 39/08* (2013.01); *B64D 27/02* (2013.01); *B64D 27/04* (2013.01); *B64D 27/24* (2013.01); *B64D 35/04* (2013.01); *B64C 2201/02* (2013.01); *B64C 2201/042* (2013.01); *B64C 2201/044* (2013.01); *B64C 2201/108* (2013.01); *B64C 2201/14* (2013.01); *B64D 2027/026* (2013.01)

(56) References Cited

U.S. PATENT DOCUMENTS

| | | | |
|---|---|---|---|
| 7,631,834 B1 * | 12/2009 | Johnson | B64C 39/024 244/17.11 |
| 9,376,208 B1 * | 6/2016 | Gentry | G08G 5/006 |
| 9,938,001 B1 * | 4/2018 | Parent | B64C 39/024 |
| 10,246,186 B1 * | 4/2019 | Beckman | B64C 27/08 |
| 2008/0006743 A1 | 1/2008 | Miller et al. | |
| 2013/0206915 A1 * | 8/2013 | Desaulniers | B64C 39/028 244/165 |
| 2013/0206921 A1 * | 8/2013 | Paduano | B64C 13/16 244/7 C |
| 2014/0238437 A1 * | 8/2014 | Tomkins | F28G 9/00 134/1 |
| 2016/0016650 A1 * | 1/2016 | Smith | B63H 5/125 476/9 |
| 2018/0043984 A1 * | 2/2018 | Robertson | B64D 5/00 |

FOREIGN PATENT DOCUMENTS

| | | |
|---|---|---|
| TR | 201705836 A2 | 9/2017 |
| WO | 2014076403 A1 | 5/2014 |
| WO | 2017043980 A1 | 3/2017 |

* cited by examiner

AUTONOMOUS UNMANNED AERIAL VEHICLE

CROSS REFERENCES TO THE RELATED APPLICATIONS

This application is the national phase entry of International Application No. PCT/TR2018/050352, filed on Jul. 6, 2018, which is based upon and claims priority to Turkish Patent Application No. 2017/10000, filed on Jul. 6, 2017, and Turkish Patent Application No. 2018/09680, filed on Jul. 6, 2018, the entire contents of which are incorporated herein by reference.

TECHNICAL FIELD

This patent application has been filed as an additional patent application to the patent application numbered 2017/10000 filed on 6 Jun. 2017 in Turkey.

The invention is related to an autonomous unmanned aerial vehicle for land, sea and air use.

The invention is more specifically related to an unmanned aerial vehicle which can vertically take off and land, fly with fixed wings and stay in the air silently for a long time by means of a balloon inflated behind it.

BACKGROUND

At present manned/unmanned aerial vehicles comprise vehicles with rotary blades (helicopter), vehicles with fixed wings (airplanes) and balloons. They can be manned or unmanned, and those classified as fixed wing and balloon type air vehicles which can also fly without an engine.

Unmanned aerial vehicle (UAV), commonly known as drone (ground-controlled aerial vehicle) is a kind of airplane controlled by a remote control. Unmanned aerial vehicles are divided into two categories: The first one are those remotely controlled, and the second one are those which can automatically move according to a certain flight plan. Previously intended for exploration, unmanned aerial vehicles are also used for many assault missions at present.

Various developments have been carried out in the art in relation with unmanned aerial vehicles. The United States patent document US2013206915 in the prior art describes an unmanned aerial vehicle which can vertically take off and land. The aerial vehicle comprises an upper drive train which provides vertical thrust and which can be adjusted according to three axes, single or counter-rotating propeller, central body with 3D articulation at a variable flexibility level to realize stabilization of the vehicle's configuration and support function, and a balloon installed in the center of the upper drive train. This balloon is inflated with helium or hydrogen gas. The vertical rise of the drive unit is provided by the thrust generated by the upper drive train and the lower drive train. The vertical rise of the drive unit is provided by the thrust generated by the upper drive train which is an engine blade or turbine or spiral turbine, and the lower drive train. The articulation function with 3D ball enables changing direction of the drive trains to allow for going towards a certain direction.

The International patent document WO2014076403 in the prior art describes an aerial vehicle which comprises a body extending through a longitudinal main axis, two wings on both sides of the body, and two drive units. In the invention, the angle between the front edge of the wings and the long edge is equal to 90°. In other words, the wings have a triangular form in the aerodynamic flight position. The end of each wing's longitudinal edge creates a leg which rests on the vehicle. Besides, the wings comprise an interlocking mechanism to fix the wings on the body during the aerodynamic flight position.

The International patent document WO2017043980 in the prior art describes an unmanned aerial vehicle. The rotor mechanism of the invention comprises a first rotation axis and a first propeller connected to the engine, and a second propeller connected to the second engine. The length of the second propeller is smaller than that of the first propeller.

The US patent document US2008006743 in the prior art describes an unmanned aerial vehicle which runs on hydrogen. The aerial vehicle may include all combined or partially combined structural properties for lightness and resistance and wide wing clearances compared to the body (3.0 or larger). According to one embodiment of the airplane, one or more internal combustion engines are used for burning hydrogen; each engine runs a propeller. The hydrogen fuel is stored as a cryogenic liquid in the containers on the body, and it is evaporated in a heat exchanger before being charged to an internal combustion engine.

The Turkish patent document 2017/05836 of the prior art describes internal combustion explosion engine primarily and fundamentally for unmanned aerial vehicles as well as any vehicles, generators, compressors and pumps. The mechanical power transmission organs are simplified and made lighter with the engine included in the invention.

However, unmanned aerial vehicles with fixed wings cannot stay in the air for a long time and they always need to move. They cannot stay in a suspended position in the air like a helicopter or balloon and they need a track for take-off and landing.

Multicopters, among unmanned aerial vehicles, can vertically take off and land, move in three axes, take off, fly and stay in the air by means of the air generated by the propellers connected to the engine(s). These systems, which are generally used with fixed angle propellers, move with the lifting force generated by the engines and the generated rotation force. However, the time for staying in the air is very short for multicopters and they have very limited load bearing capacities and they fly at very low altitudes.

Another unmanned aerial vehicle which is a balloon, moves slowly and it cannot remain constant at the desired point without anchoring due to the effect of the wind. It is easy to identify, shoot/take down balloons at low altitude and they have short ranges and it is difficult to control them.

In order to resolve the foregoing problems, the invented double propeller, engine and balloon containing autonomous unmanned aerial vehicles are required to be developed.

SUMMARY

The objective of this invention is to provide an unmanned aerial vehicle which can vertically take off and land, fly with fixed wings and stay in the air silently for a long time my means of a balloon inflated behind it.

Another objective of this invention is to provide unmanned aerial vehicles which do not need a track for take-off and landing.

Another objective of this invention is to provide an unmanned aerial vehicle with an eco-friendly engine, which consumes hydrogen as fuel.

The autonomous unmanned aerial vehicle rises with an internal combustion engine, and after reaching the target point, it can stay in the air for a long period of time and silently by means of the electrical engine and the balloon.

Detailed images can be taken during this period. The vehicle which completes its duty, ejects the inflated balloon and begins landing.

BRIEF DESCRIPTION OF THE DRAWINGS

The unmanned aerial vehicle provided to achieve the objective of this invention is shown in the attached figures.

According to the figures.

Figure 1:
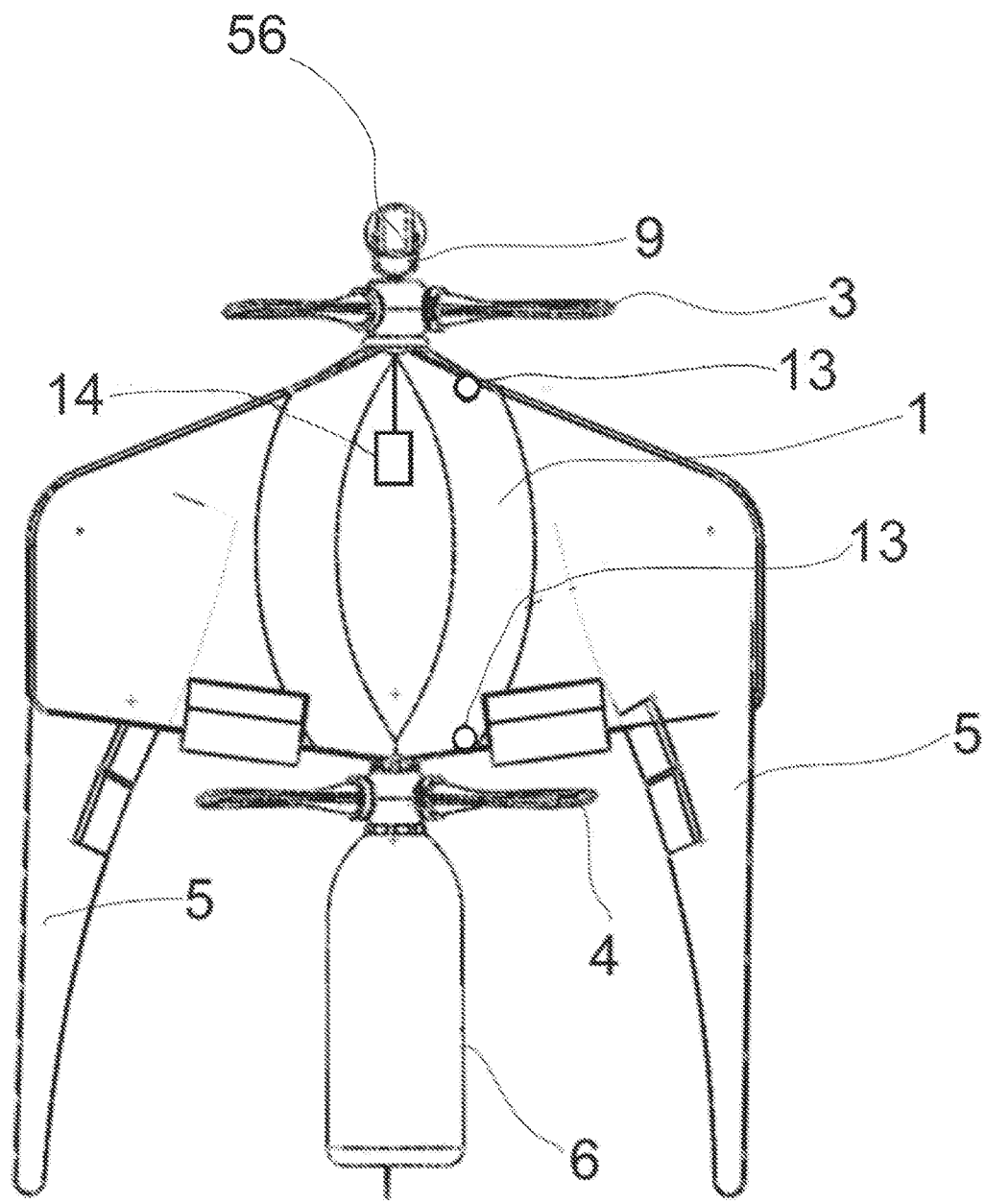
FIG. 1: is a front view of unmanned aerial vehicle subject to the invention during the takeoff position.

The parts on the figures have each been numbered, and these numbers refer to the following items:

1. Body
2. Engine assembly
3. Front propeller
4. Rear propeller
5. Wing
6. Liquid hydrogen tank
7. Balloon
8. Balloon ejection unit
9. Platform
10. Stabilizer
11. Wing body
12. Wing end
13. Microphone
14. Gyroscope unit
15. Internal combustion engine
16. Propeller power transmission shaft
17. Control rack
18. Rack power transmission hub
19. Rack gear train
20. Rotary body bearings
21. Conic cam
22. Conic cam follower
23. Cam follower shaft
24. Cam follower gear
25. Propeller closing gear
26. Rack linear actuator
27. Conic cam linear actuator
28. Slide bearing
29. Internal cylinder
30. External cylinder
31. Engine retainer
32. DC engine
33. Coupler
34. Screw shaft
35. Screw shaft nut
36. Screw shaft nut socket
37. Load balancing mechanism
38. Hydrogen fuel tube
39. Hydrogen inlet valve
40. Hydrogen outlet valve
41. Engine fuel inlet valve
42. Engine fuel outlet valve
43. Helical coiled tube
44. Heat exchanger
45. Balloon cover
46. Supercharger
47. Two-lobe rotary piston
48. Three-lobe rotary piston 49. Four-lobe rotary piston
50. Main driving shaft
51. Transfer gears
52. Air inlet orifice
53. Air outlet orifice
54. Rotary piston drive shaft
55. Air passage clearance
56. Multispectral camera

DETAILED DESCRIPTION OF THE EMBODIMENTS

The invention is an unmanned aerial vehicle and it comprises;
- an engine assembly (2) which is located in the body (1), and provides motion to the front propeller (3) and rear propeller (4),
- a front propeller (3) which is located in front of the body (1) which is connected to the engine assembly (2),
- a rear propeller (4) which is connected to the engine assembly (2) and is located at the rear of the body (1), which can rotate in the same or opposite direction to the front propeller (3),
- 3 wings (5) which enable vertical take-off and landing of the aerial vehicle, the sharp ends of which are used as landing gear, and which are installed on the body (1) with constant 120° spacing,
- a liquid hydrogen tank (6) installed in the center of the rear propeller (4),
- a balloon (7) which is wrapped around the liquid hydrogen tank (6), which is inflated with the hydrogen in the liquid hydrogen tank (6), and enables suspension of the unmanned aerial vehicle in the air,
- a balloon ejection unit (8) which is located at the end portion of the liquid hydrogen tank (6) which releases the balloon (7) during the landing of the unmanned aerial vehicle.

The invention is an unmanned aerial vehicle which comprises a stabilized platform (9) that carries a multispectral camera (56) which is installed in the center of the front propeller (3).

The invention is an unmanned aerial vehicle, which comprises equivalent and symmetrical lateral-vertical stabilizers (10) on the wings (5) which primarily increase the lift and partially the friction by increasing wing (5) hump.

The invention comprises an engine assembly (2), an internal combustion engine (15) and electrical engine in an unmanned aerial vehicle. The fuel supply of the engine assembly (2) is the hydrogen stored in the liquid hydrogen tank (6).

In the unmanned aerial vehicle subject to the invention, the engine assembly (2) comprises a monoblock hybrid engine which runs with both internal combustion and electricity.

The invention is an unmanned aerial vehicle, in one embodiment of which the wing (5) comprises;
- a wing body (11) fixed on the body (1) and placed with 120° spacing,
- a wing end (12) which is mounted on the end of the wing body (10), which is positioned in the same direction as the wing body (11) while the vehicle takes off and gains altitude, expands during gliding and increases the gliding capability of the vehicle by turning 180° in the opposite direction.

The unmanned aerial vehicle which can vertically take-off and land is positioned in such a manner that its wings (5) will touch the ground during take-off (FIG. 1) and the vehicle gains altitude after take-off and when it is in the friendly zone, by means of the internal combustion engine (15) included in the vehicle engine assembly (2). As the vehicle gains altitude, the front propeller (3) and the rear propeller (4) rotate in reverse directions. As a result, by means of the angular moment, the vehicle will not turn around its own axis during flight. Movement in reverse directions of the front propeller (3) and rear propeller (4) of the engine assembly (2) is ensured with a suitable transmission system located in the body (1).

Figure 2:
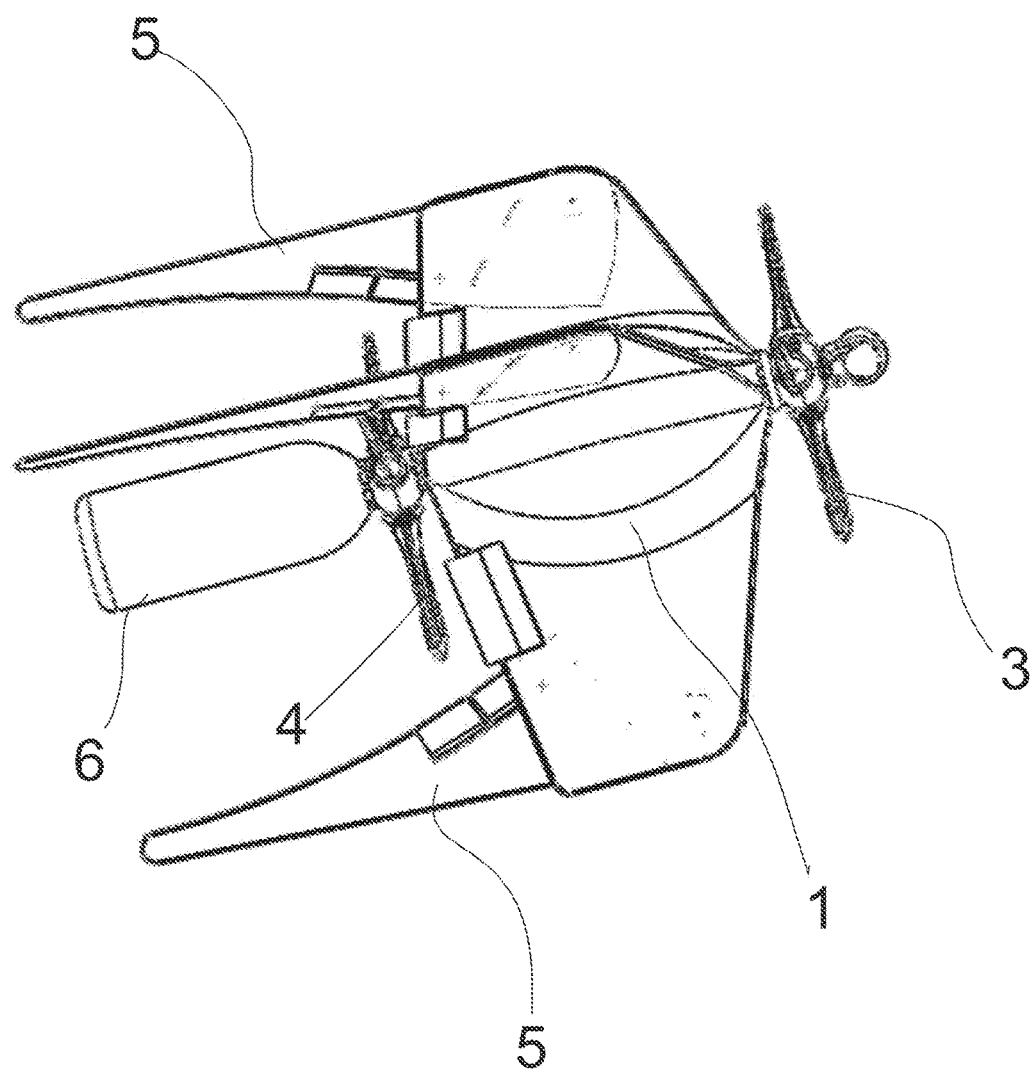
FIG. 2: Perspective view of the position of the unmanned aerial vehicle subject to the invention before being positioned at a lateral axis.
Figure 3:
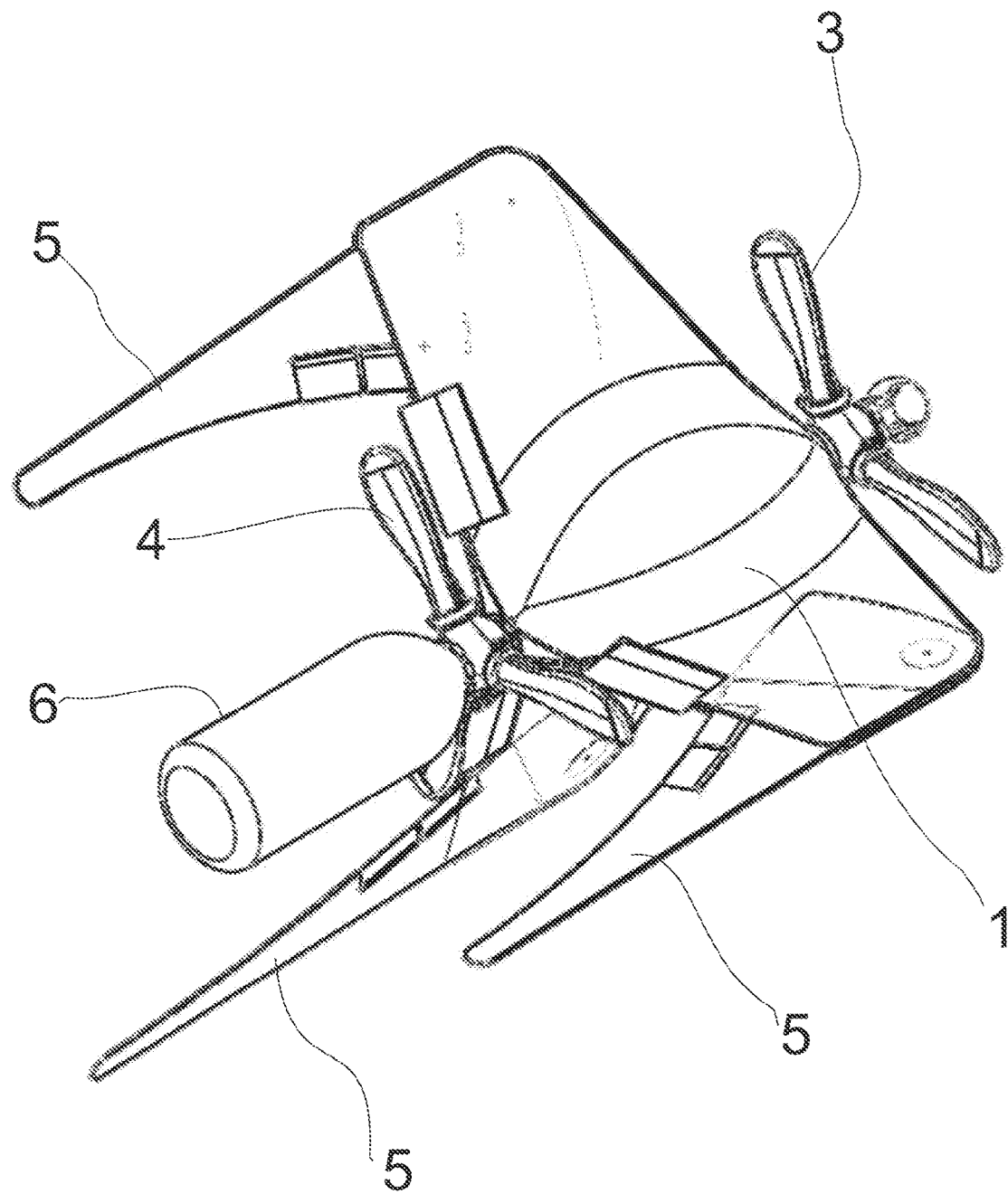
FIG. 3: Perspective view of the position of the aerial vehicle subject to the invention before being positioned at a lateral axis at a different angle.
Figure 4:
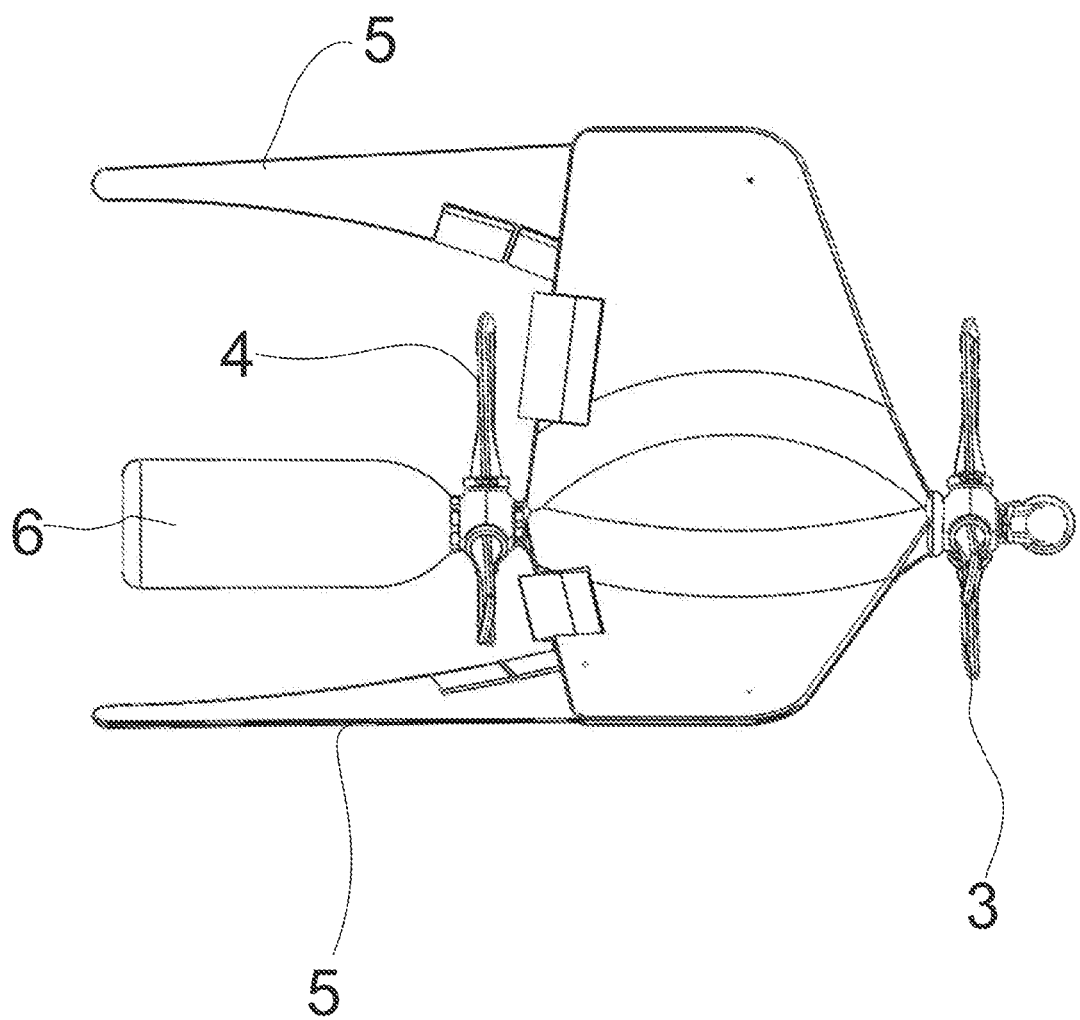
FIG. 4: Lateral view of the unmanned aerial vehicle subject to the invention while flying at a lateral axis.
Figure 5:
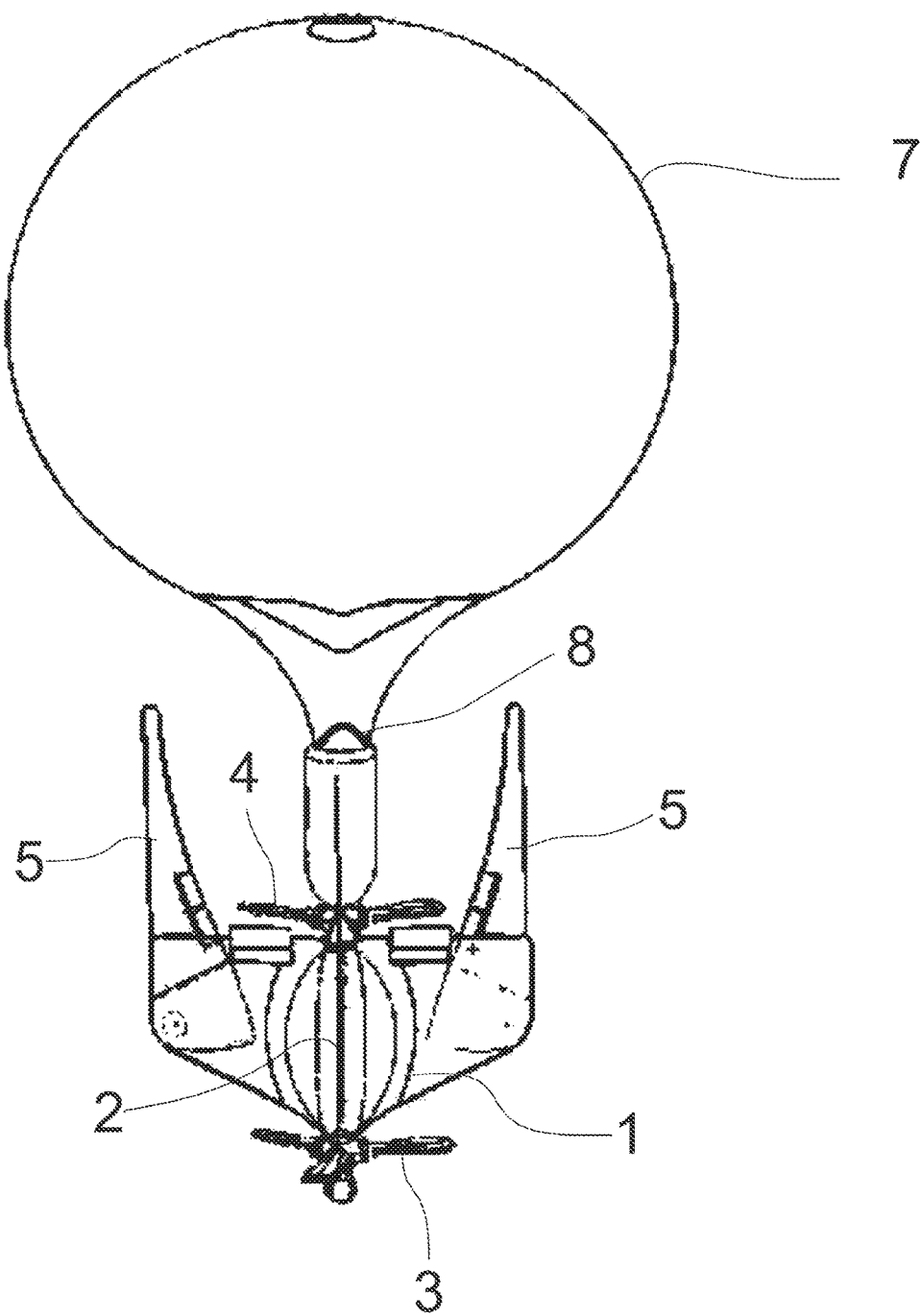
FIG. 5: Lateral schematic view of the unmanned aerial vehicle subject to the invention when the balloon is inflated.

The direction is changed with the remote control for the rising unmanned aerial vehicle to glide in the lateral axis. During this redirection process, the unmanned aerial vehicle reaches a slope position in a manner to create a narrow angle with the lateral axis first, and then it continues flying horizontally. (FIG. 2, FIG. 3 and FIG. 4) The unmanned aerial vehicle which gains altitude in the vertical axis and reaches the lateral axis, takes a completely reverse of the take-off position at the target point. At this position, the vehicle runs with an electrical engine in the engine assembly (2) and the balloon is inflated with the hydrogen in the liquid hydrogen tank (6) (FIG. 5). As a result, the vehicle maintains its position for a long time and it operates remaining in the air for 24 to 48 hours. The front propeller (3) and the rear propeller (4) of the vehicle suspended in the air operate idle. As a result, the volume of the balloon (7) decreases, it becomes difficult to notice and it remains in the air more stably. The control of with which one of the engines in the engine assembly (2) the front propeller (3) and the rear propeller (4) are to operate is carried out quickly by means of a remote control and/or an inertial navigational system located in the vehicle.

As the unmanned aerial vehicle remains stable in continuously suspended position, it captures very precise images with the multispectral camera (56) located on the stabilized platform (9) that is mounted in the middle section of the front propeller (3). A Gyro unit (14) attached to the front propeller (3) provides reference to the inertial navigational system of the unmanned aerial vehicle, and enables its correct position without support from GPS-like external reference elements.

The rear propeller (4) which runs in the reverse direction to the front propeller (3) rotates in a manner to create 180 degrees phase different sound which has an equal rotation by means of the MEMS microphones (13) located on the unmanned aerial vehicle to eliminate the engine assembly's (2) noise when desired, thus eliminating and/or reducing the front propeller's (3) noise with acoustic interference. As a result, the invention can move silently even with an internal combustion engine (15).

Figure 6:
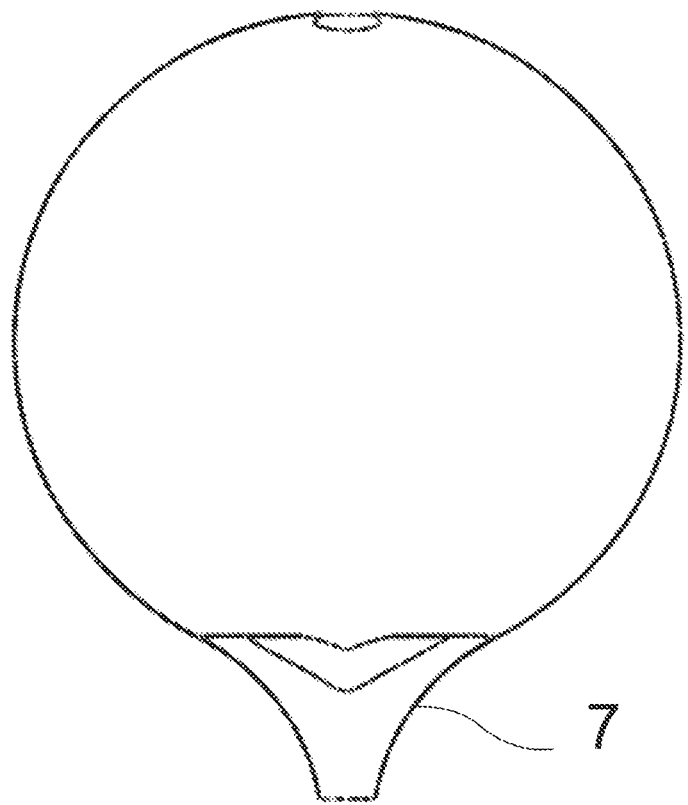
FIG. 6: Lateral schematic view of the unmanned aerial vehicle subject to the invention when the balloon is ejected.
Figure 6:
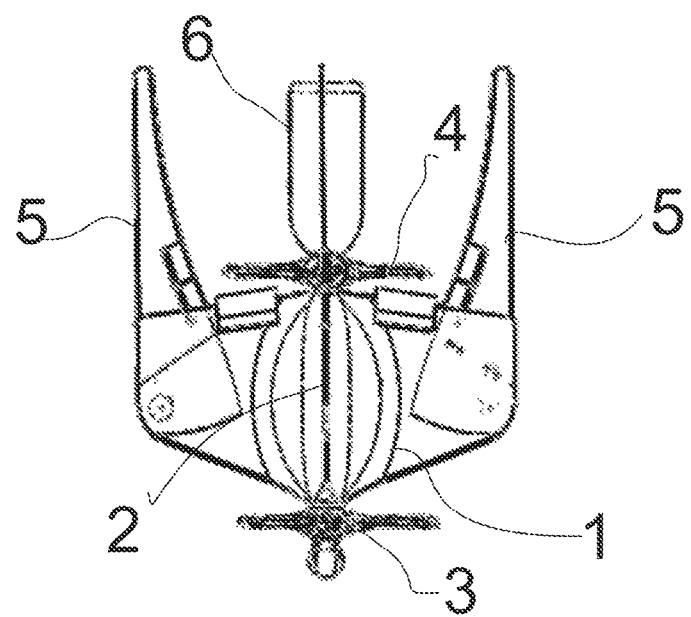

After the duty of the unmanned aerial vehicle is completed, first the balloon (7) is further inflated with the remaining hydrogen and then the autonomous unmanned aerial vehicle takes off silently. At an altitude where the engine assembly's (2) sound cannot be heard, the balloon ejection unit (8) releases the balloon (7) and the vehicle begins descending. (FIG. 6)

Figure 7:
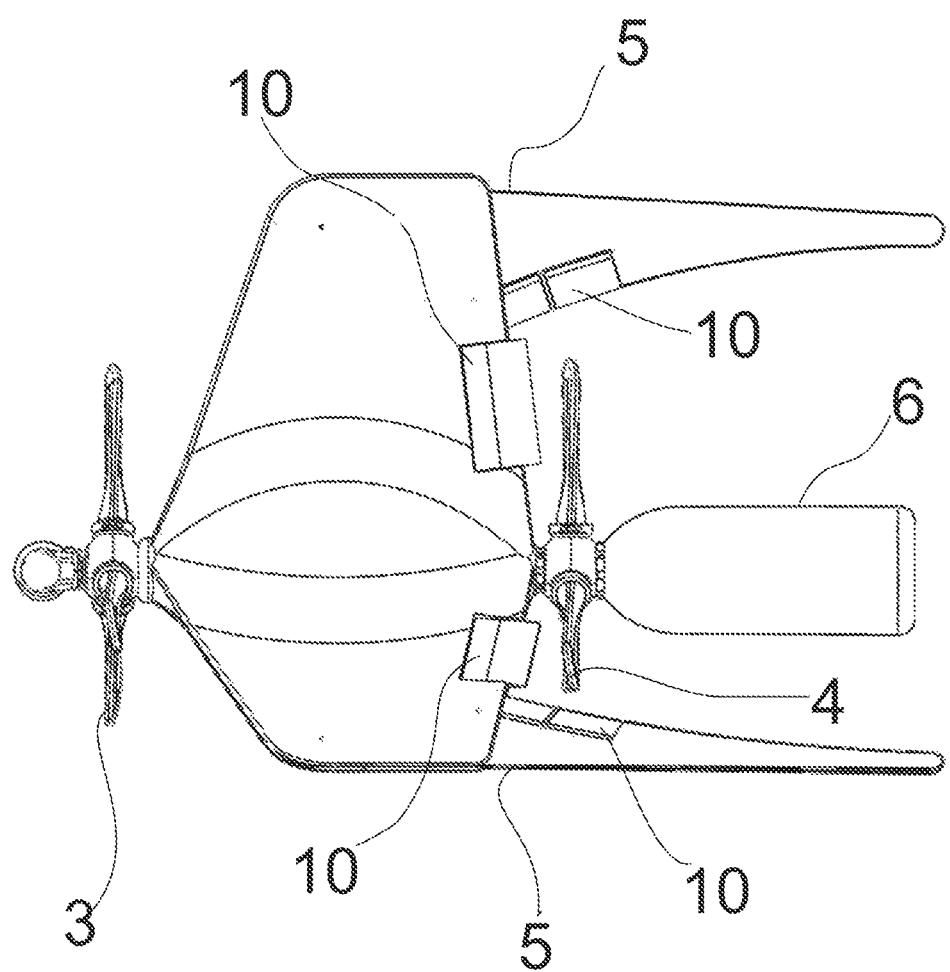
FIG. 7: Lateral view of the unmanned aerial vehicle subject to the invention when it is floating at a lateral axis during landing.
Figure 8:
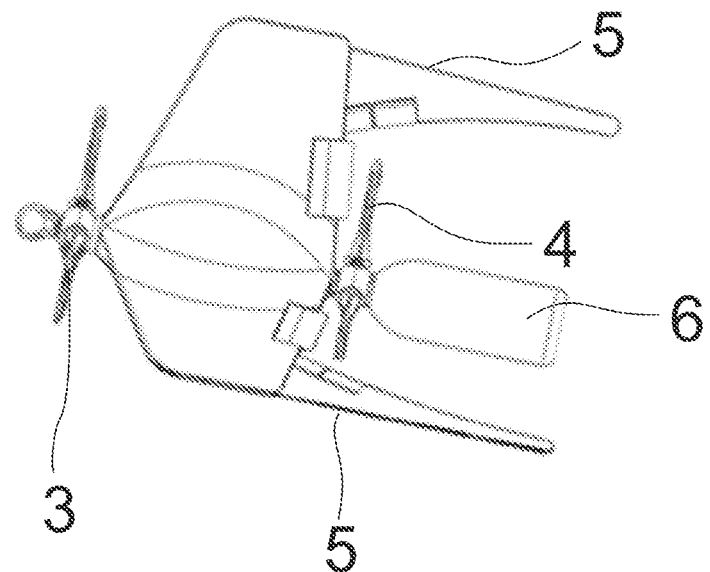
FIG. 8: View of the position of the unmanned aerial vehicle subject to the invention before the landing position.
Figure 9:
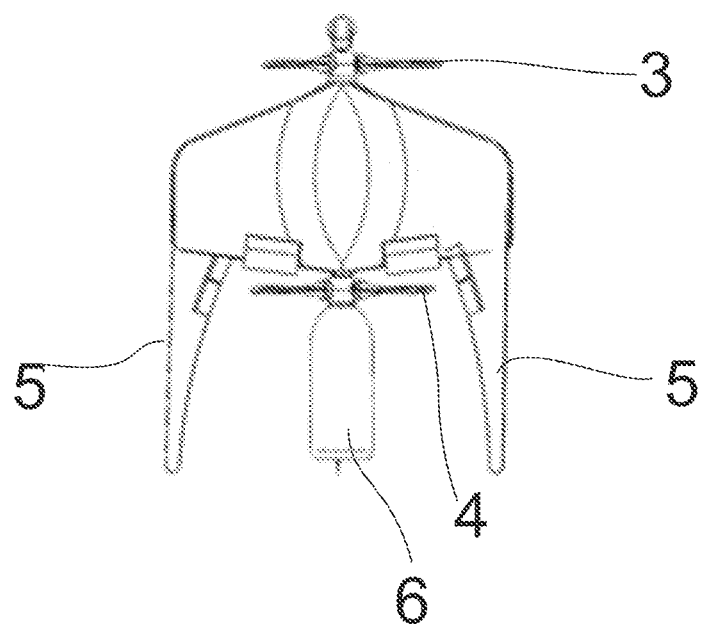
FIG. 9: Front view of the landing position of the unmanned aerial vehicle subject to the invention.

During the landing of the vehicle, similar to the take-off motion, the vehicle is redirected by means of the remote control for gliding in the lateral axis. During this redirection process, the unmanned aerial vehicle reaches a slope position in a manner to create a narrow angle with the lateral axis first, and then it continues flying horizontally (FIG. 7). During landing, the wings (5) touch the ground, they reach the initial take-off position and they complete landing (FIG. 8 and FIG. 9).

Figure 10:
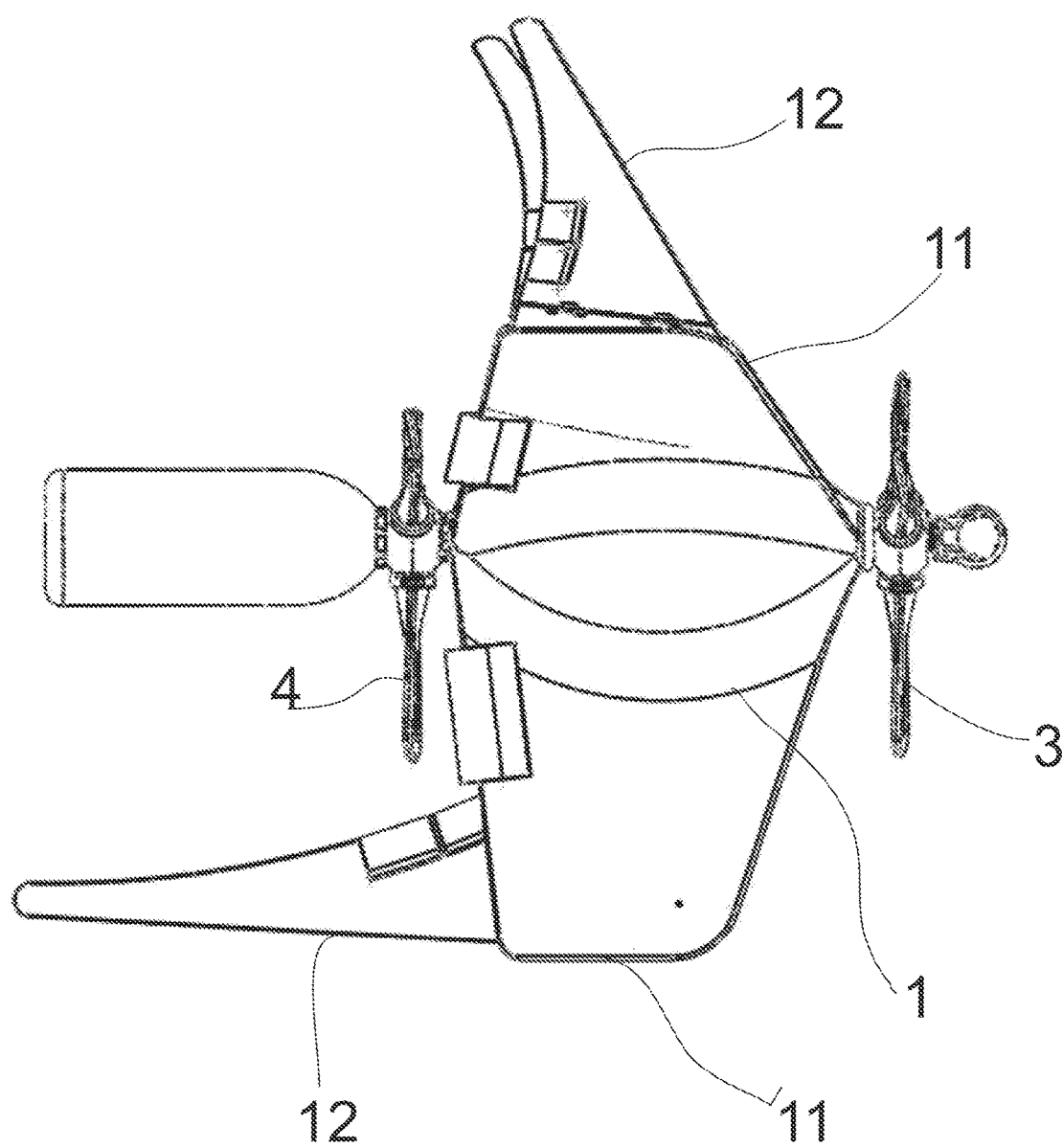
FIG. 10: Side view of the unmanned aerial vehicle having a moving wing while gliding on a lateral axis.
Figure 11:
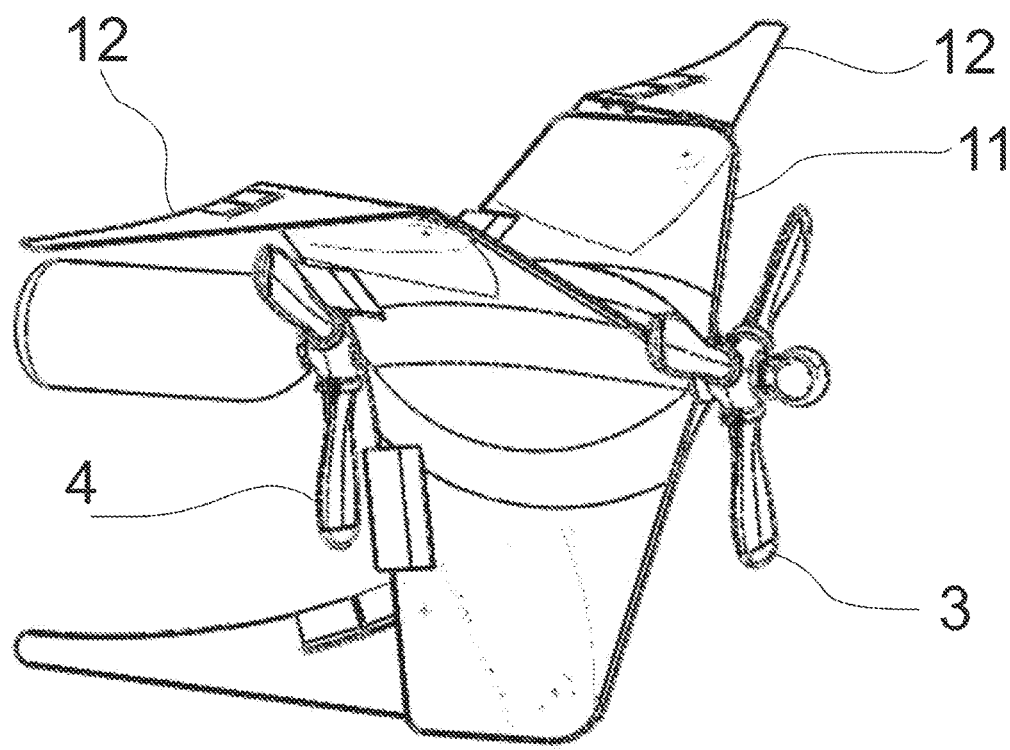
FIG. 11: Perspective view of the unmanned aerial vehicle having a moving wing while gliding on a lateral axis.
Figure 12:
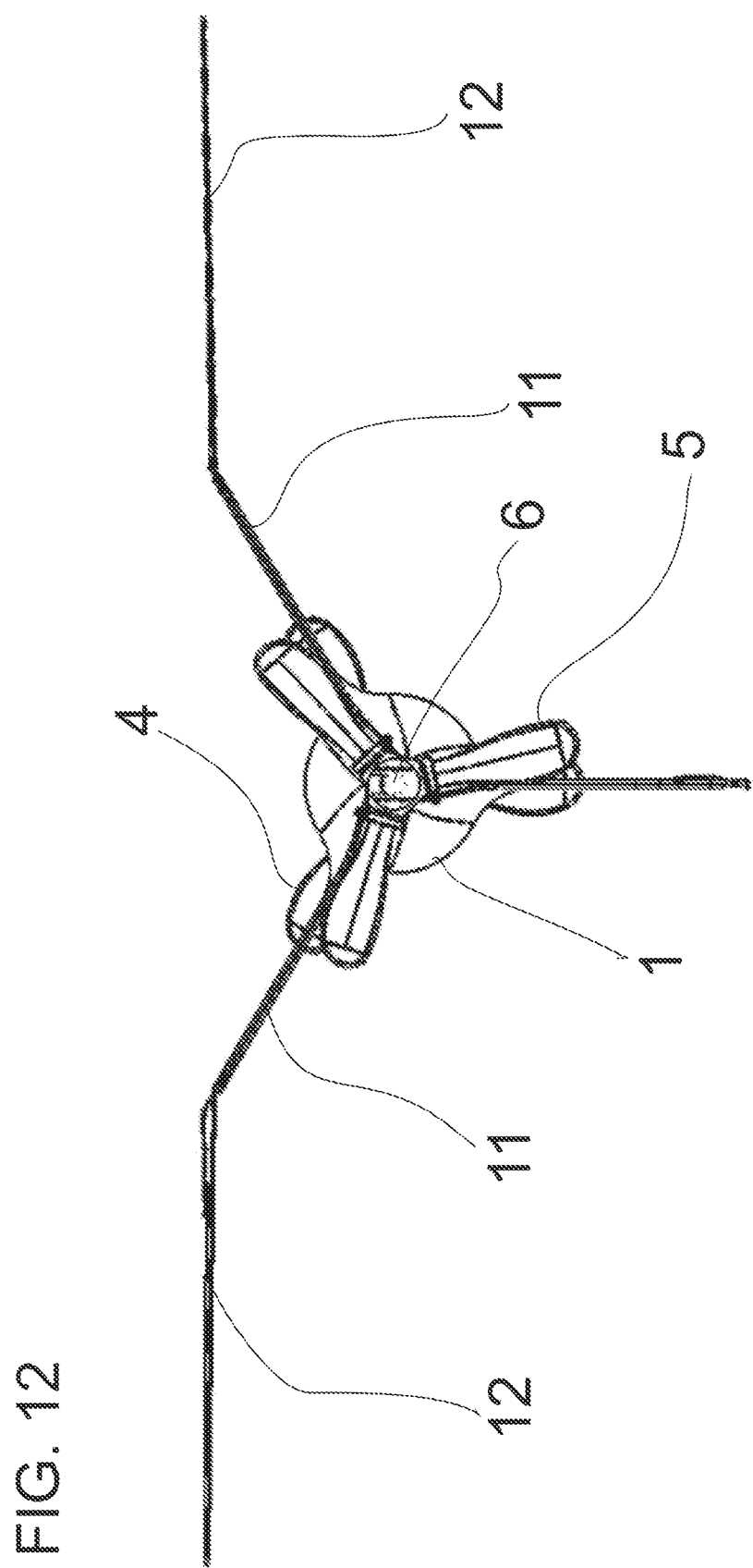
FIG. 12: Front view of the unmanned aerial vehicle having a moving wing while gliding on a lateral axis.
Figure 13:
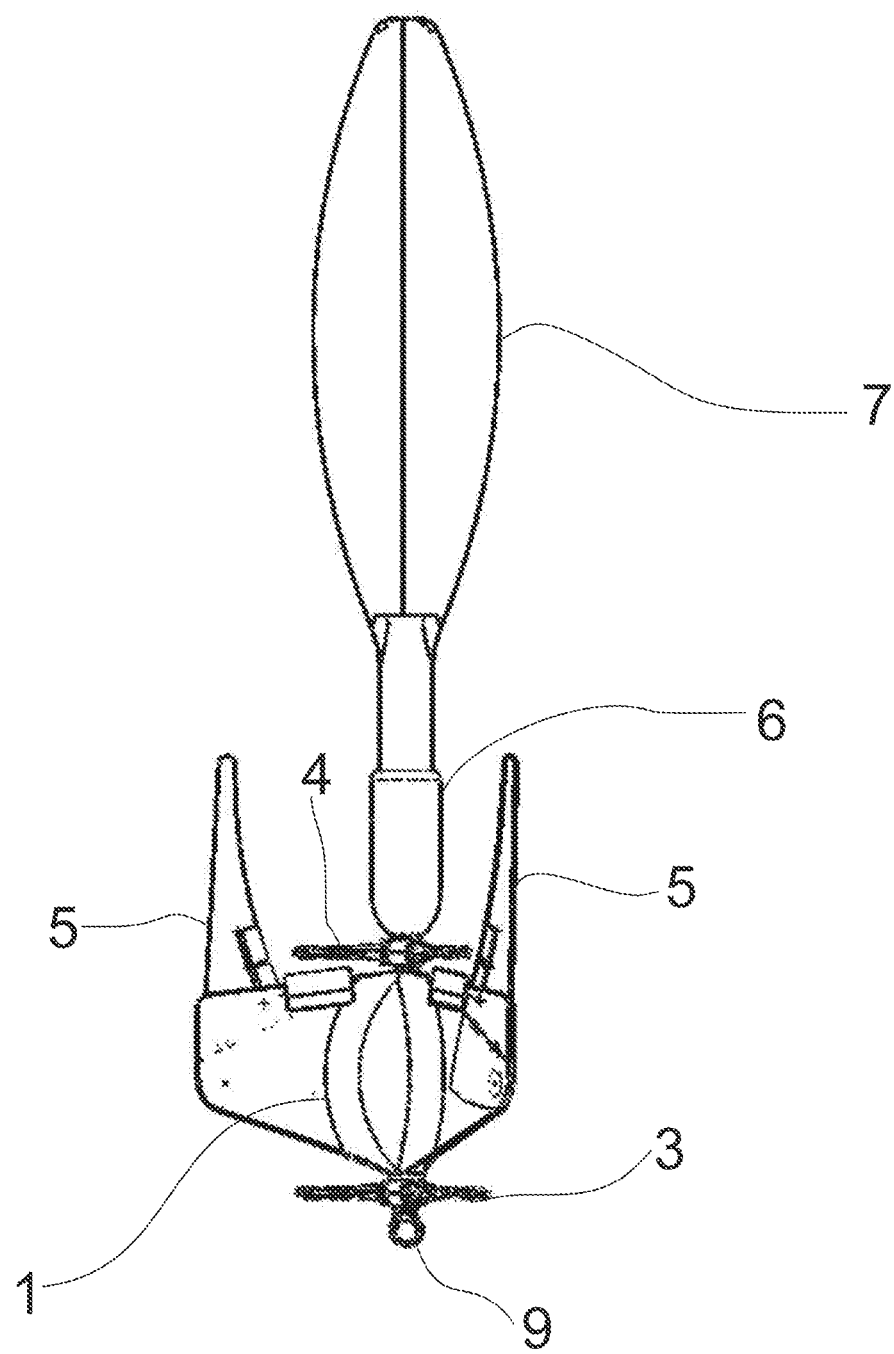
FIG. 13: Front schematic view of the unmanned aerial vehicle subject to the invention when the balloon is inflated.
Figure 14:
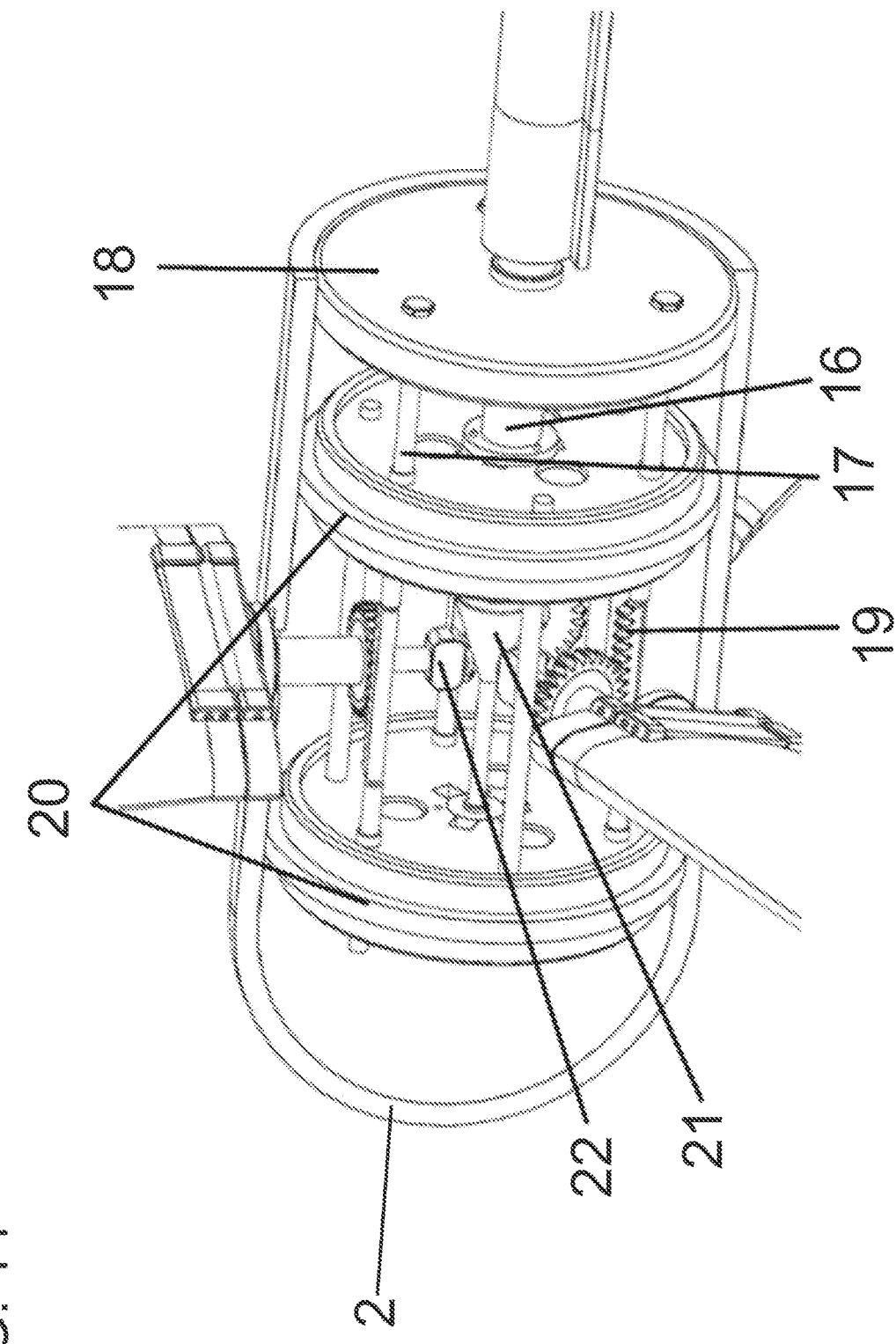
FIG. 14: View of the pitch control mechanism of the propellers on the unmanned aerial vehicle subject to the invention shown at a different angle.
Figure 15:
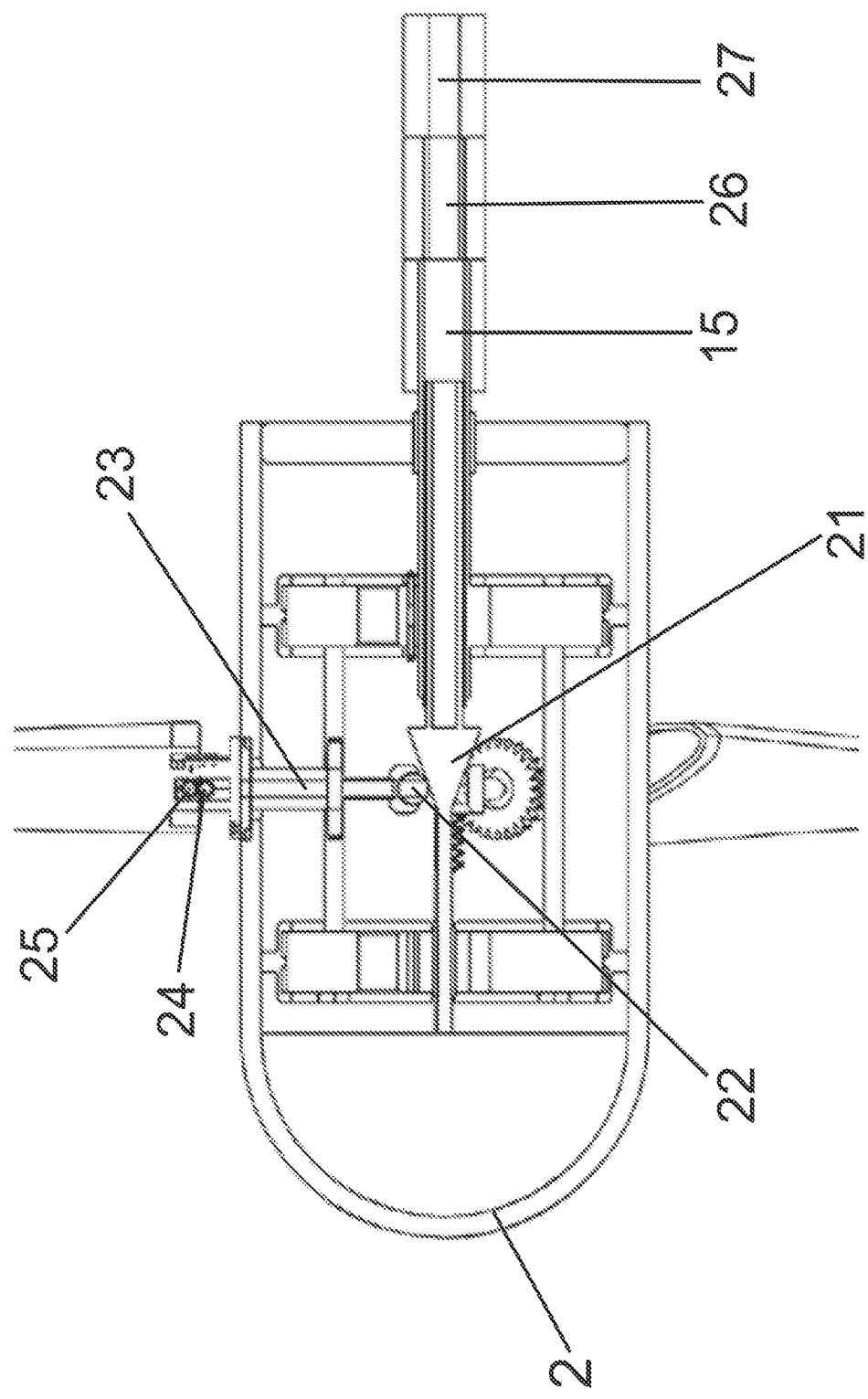
FIG. 15: Lateral schematic view of the pitch control mechanism of the propellers of the unmanned aerial vehicle subject to the invention.
Figure 16:
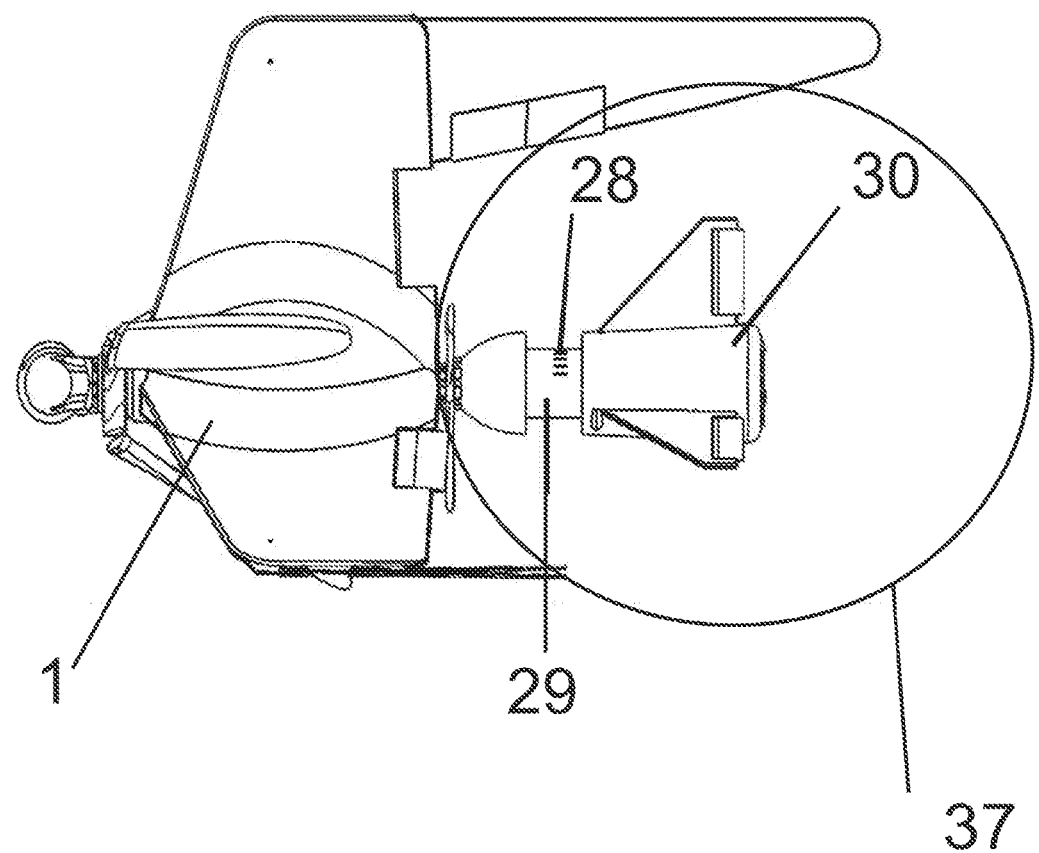
FIG. 16: Lateral view of the load balancing mechanism of the unmanned aerial vehicle subject to the invention while gliding on a lateral axis.
Figure 17:
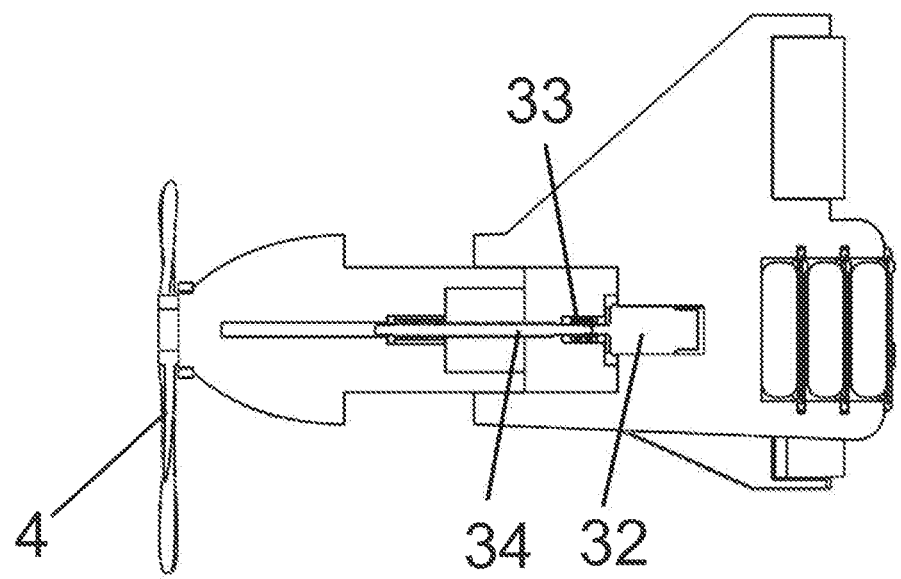
FIG. 17: Lateral schematic view of the load balancing mechanism of the unmanned aerial vehicle subject to the invention.
Figure 18:
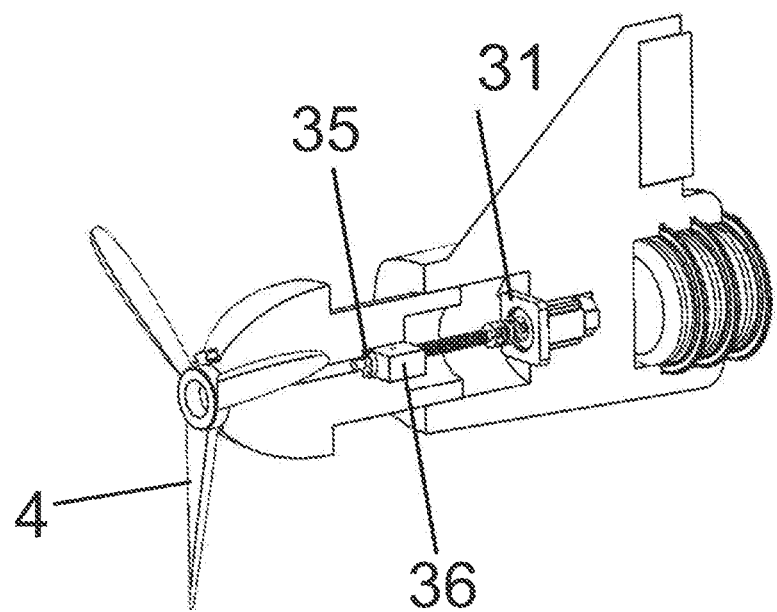
FIG. 18: Schematic view of the load balancing mechanism of the unmanned aerial vehicle subject to the invention from a different perspective.
Figure 19:
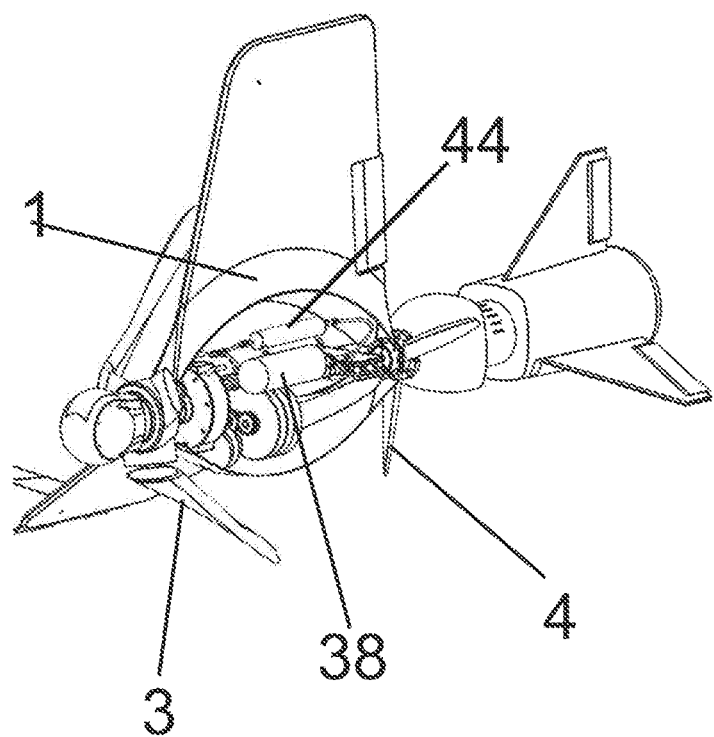
FIG. 19: Schematic view of the body of the unmanned aerial vehicle subject to the invention.
Figure 20:
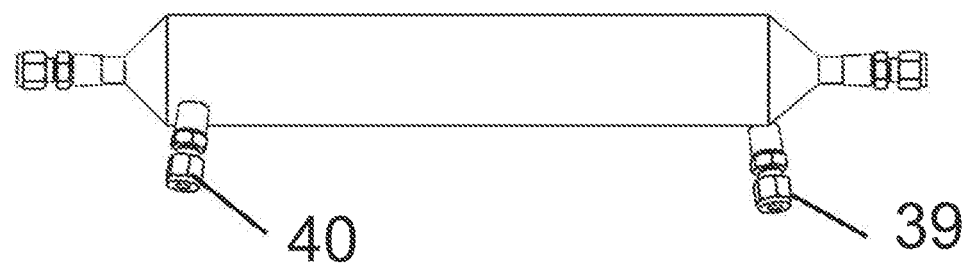
FIG. 20: Front view of the heat exchanger of the unmanned aerial vehicle subject to the invention.
Figure 21:
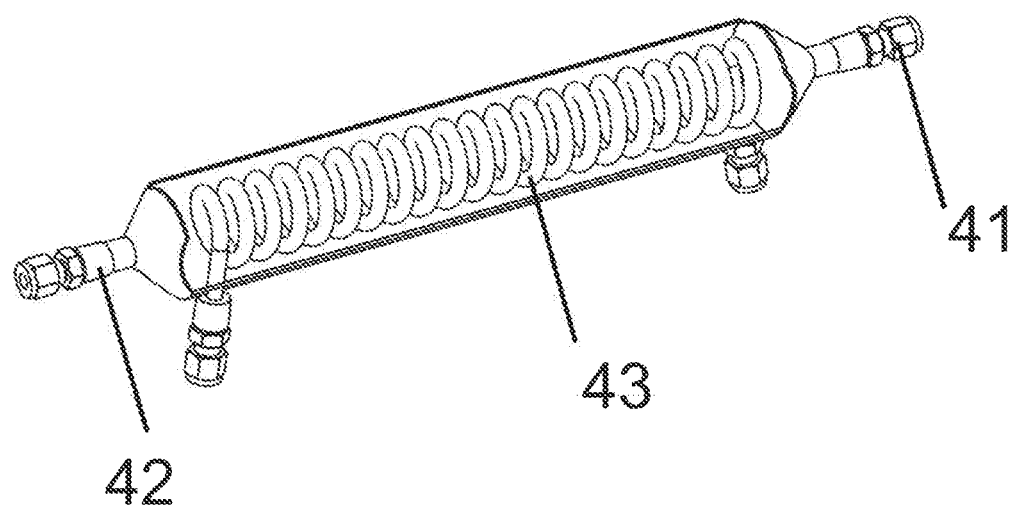
FIG. 21: Schematic view of the heat exchanger of the unmanned aerial vehicle subject to the invention.
Figure 22:
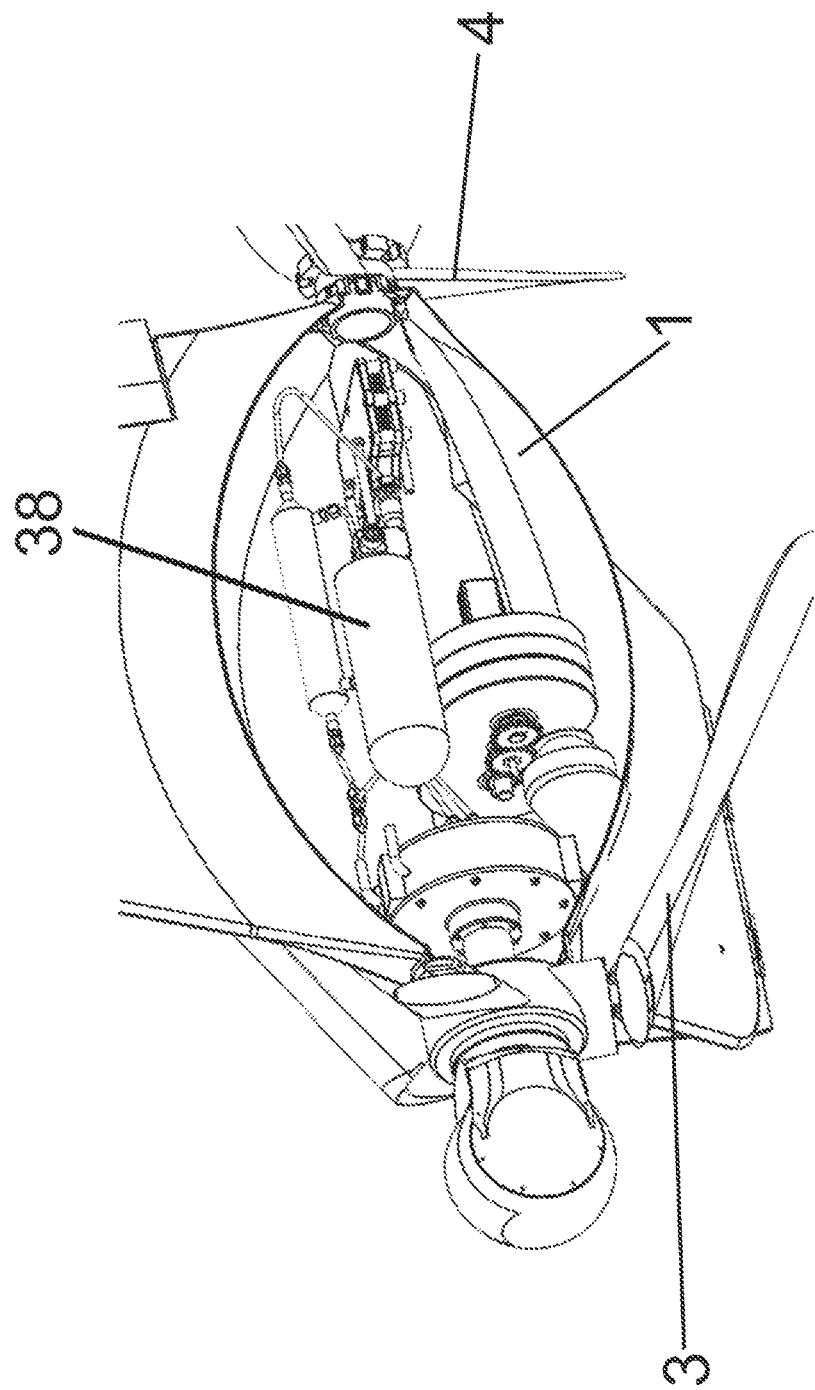
FIG. 22: Schematic view of the body on the unmanned aerial vehicle subject to the invention.
Figure 23:
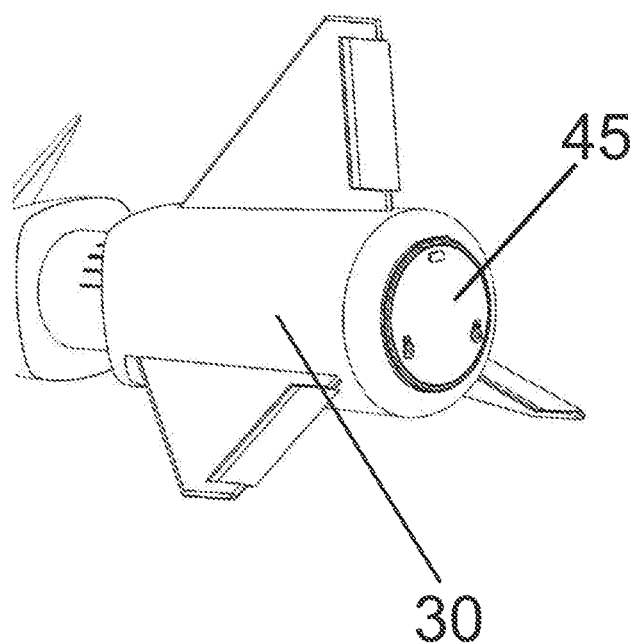
FIG. 23: Perspective view of the outer cylinder of the invented unmanned aerial vehicle.
Figure 24:
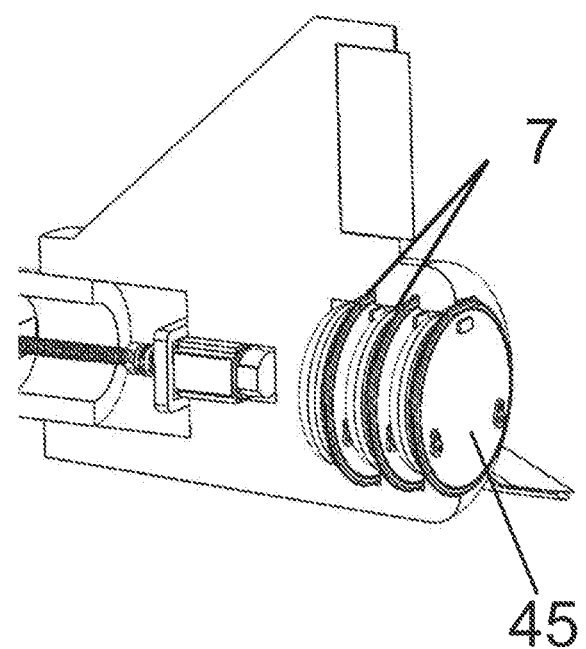
FIG. 24: Schematic view of the outer cylinder of the unmanned aerial vehicle subject to the invention.
Figure 25:
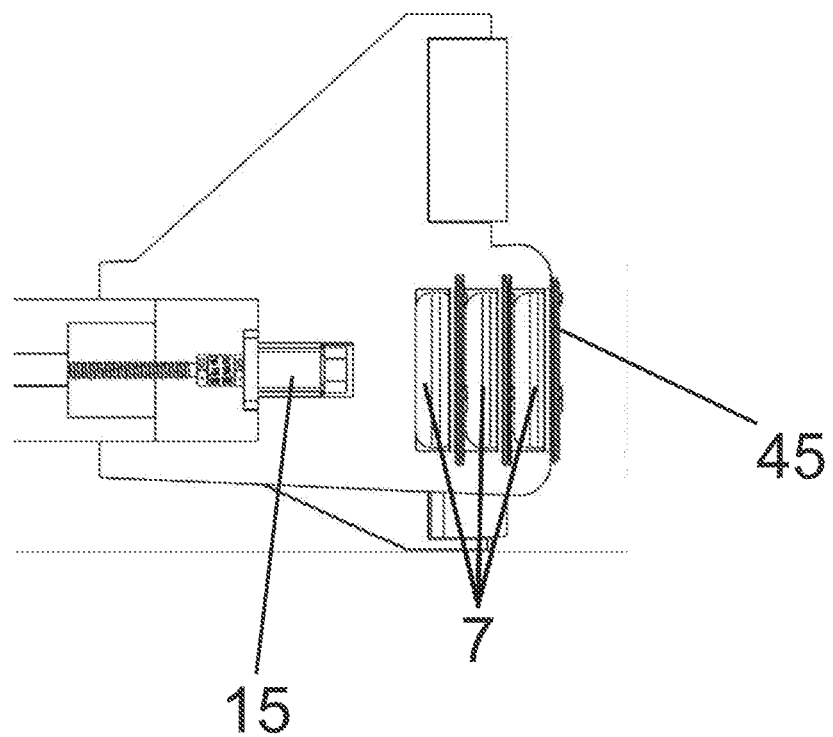
FIG. 25: Schematic view of the outer cylinder of the unmanned aerial vehicle subject to the invention, shown from a different angle.
Figure 26:
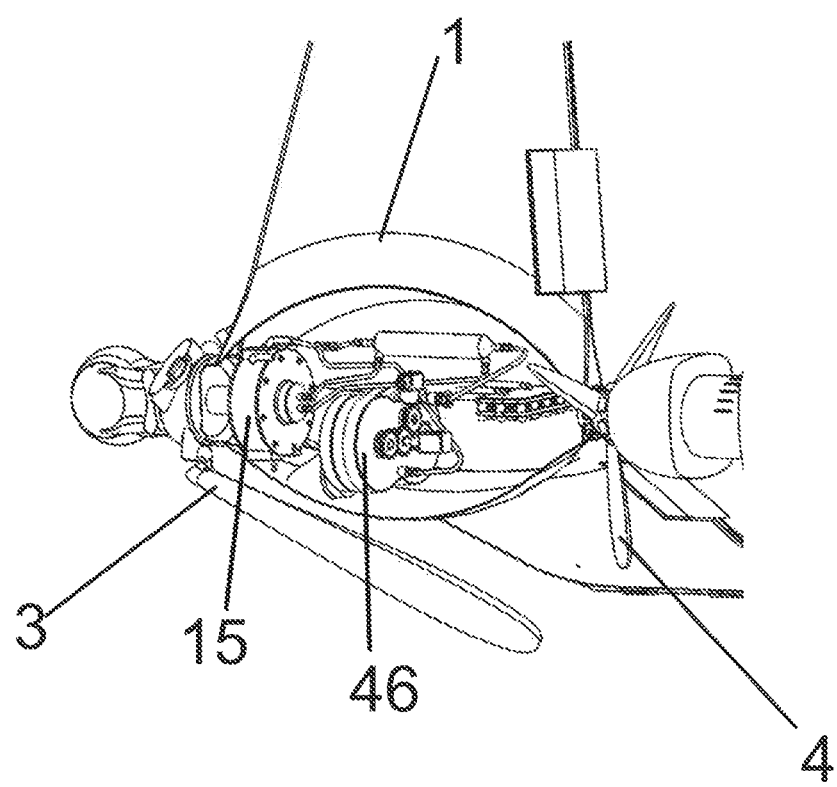
FIG. 26: Partial sectional view of the body on the unmanned aerial vehicle subject to the invention from a different angle.
Figure 28:
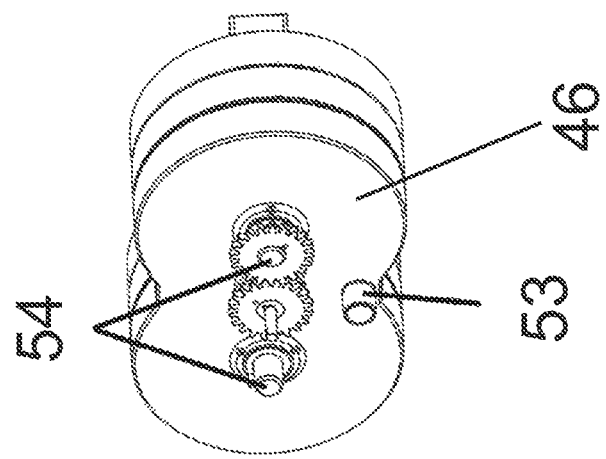
FIG. 28: Perspective view of the supercharger of the unmanned aerial vehicle subject to the invention from a different angle.
Figure 27:
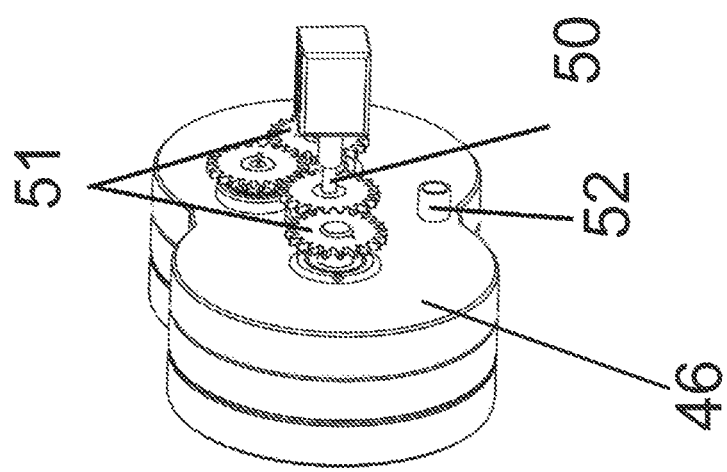
FIG. 27: Perspective view of the supercharger of the unmanned aerial vehicle subject to the invention.
Figure 30:
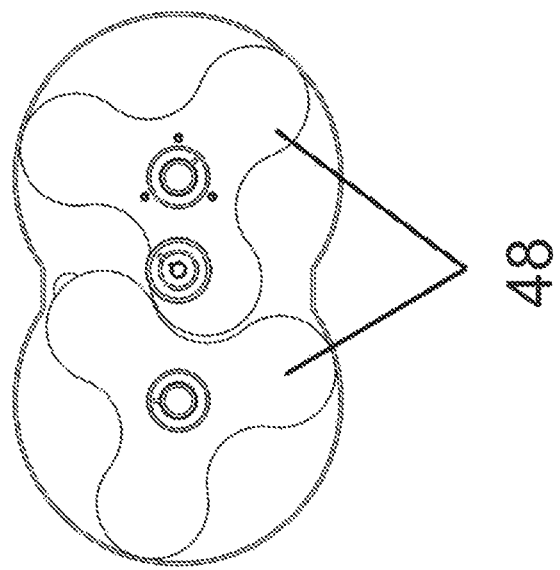
FIG. 30: Perspective view of the three-lobe rotary piston of the unmanned aerial vehicle subject to the invention.
Figure 29:
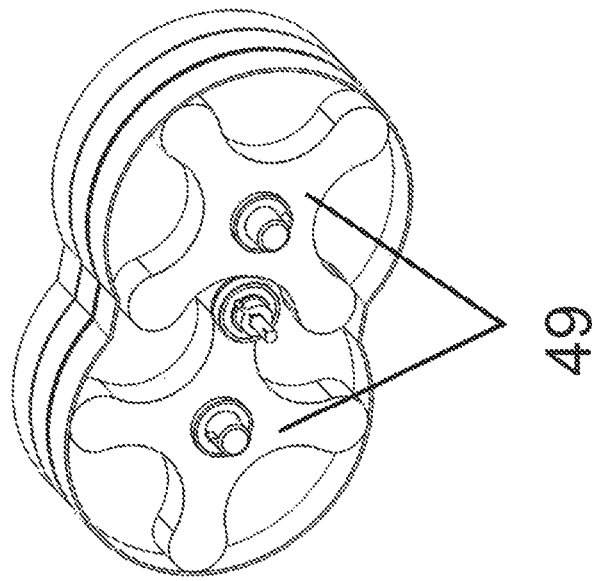
FIG. 29: Perspective view of the four-lobe rotary piston of the unmanned aerial vehicle subject to the invention.
Figure 31:
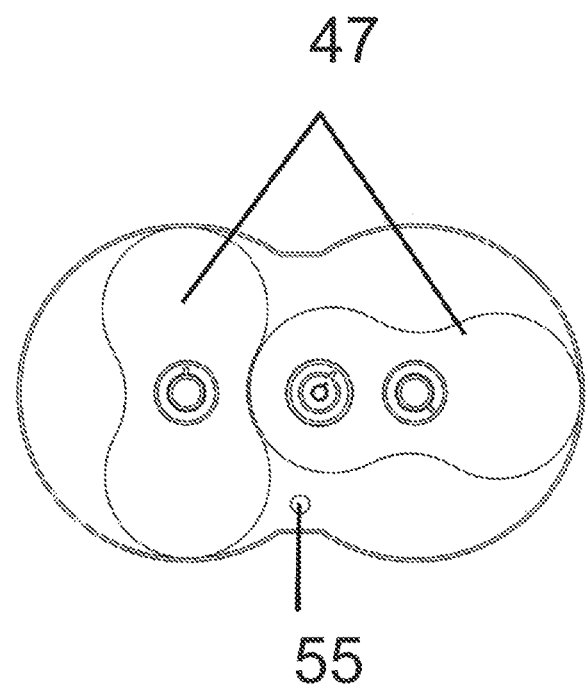
FIG. 31: Perspective view of the two-lobe rotary piston of the unmanned aerial vehicle subject to the invention.

In the event the wings (5) of the unmanned aerial vehicle are wing ends (12) which are installed on the end of the wing body (11) placed with 120° spacing, stably on the body (1) of the vehicle, in other words, if the wings (5) are moveable, the wing ends (12) open while gliding and the gliding capability of the vehicle is increased. (FIG. 10 and FIG. 11)

In the unmanned aerial vehicle, the power of the vehicle reduces when the monoblock hybrid engine of the engine assembly (2) runs with the electric engine only. Therefore, the single electric engine is run for maintaining the position at the point of duty when the balloon (7) is inflated or when it glides downward using the wings of the unmanned aerial vehicle wings (5), the liquid hydrogen in the liquid hydrogen tank (6) may be dropped as a bomb or it may be dropped in the event of an emergency, during its return, the liquid hydrogen tank (6) is discharged at a minimum level against accidents such as unintended explosion.

Furthermore, the invention is an unmanned aerial vehicle and it operates as follows;

said autonomous unmanned aerial vehicle can be operated with a remote control or can be operated autonomously, the unmanned aerial vehicle takes off by means of the internal combustion engine (15) located in the engine assembly (2), while working with an electric engine, the ends of the wings (12) are opened 20-60° and the vehicle takes off, the wing ends (12) extend 180° in the lateral axis while the vehicle continues to operate with the electric engine, after reaching the target point, the wing ends (12) are retracted and the autonomous aerial vehicle is reversed, the balloon (7) is inflated with hydrogen which is stored in the liquid hydrogen tank (6), the unmanned aerial vehicle ascends together with the balloon (7) that is inflated with hydrogen, the balloon (7) is ejected after the unmanned aerial vehicle rises to an altitude where the sound of the internal combustion engine (15) in the engine assembly (2) cannot be heard, the internal combustion engine (15) is operated and the vehicle is returned back to its original location.

Images are captured with the camera located on the platform (9) when the unmanned aerial vehicle reaches the target point.

During the operation of the unmanned aerial vehicle as suspended in the air with the balloon (7), only the rear propeller (4) runs on electricity and by activating the stabilizers (10) it maintains its position with light wind.

The unmanned aerial vehicle can land and take off on any rough surface and on water and can operate in a limited range there when desired in cases of emergency, extreme wind or bad weather conditions and/or where required by the mission.

In cases of attack or danger, the hydrogen in the liquid hydrogen tank (6) can be used as a bomb and it can be exploded.

The invention is an unmanned aerial vehicle which comprises;

a hollow cylindrical power transmission shaft (16) connected at the hub of the internal combustion engine's (15) shaft and the rotary body bearings (20), and which transfers the torque received from the output shaft of the internal combustion engine (15) to the front propeller (3) and rear propeller (4), and which is located in the engine assembly (2), a control rack (17) which consists of three non hollow cylindrical shafts born linearly on the rotary body bearings (20), which transmits the motion received from the rack linear actuator (26) to the rack geartrain (19), and is connected to the rack power transmission hub (18), a rack power transmission hub (18) in cylindrical form, which is born in a manner to allow for radial movement in the engine assembly (2) which is in the form of a disk connected with a hollow cylindrical shaft to the rack linear actuator (26) and which can both rotate with the front propeller (3) and rear propeller (14) and can move linearly for pitch control, which provides the movement of the gears that enable pitch control of the front propeller (3) and rear propeller (4) blades by transmitting the linear movement received from the rack linear actuator (26) along the control rack (17), a rack geartrain (19) which consists of three rack gears on the shaft connected to the control rack (17), and 3 cogwheels which are connected to the front propeller (3) and positioned to act together with them, cylindrically rotating body bearings (20) which are mounted in a manner to allow the radial movement of the engine assembly (2) and which acts rotationally only, transfers the torque received from the rack power transmission hub (18) to the front propeller (3) and rear propellers (4), on which the control rack (17) that advances linearly when the rack power transmission hub (18) acts linearly is supported, conic cam (21) in the form of a hollow shaft with a conic cam at its end, which is supported to allow for linear movement according to the engine assembly (2), which moves linearly as a result of the movement received from the conic linear actuator (27), allows for the movement of the conic cam follower (22) in an axis vertical to its axis of movement, and connected to the rotary body bearings (20) so as to turn together with said bearings, a conic cam follower (22) which moves on the vertical axis with the linear movement of the conic cam (21) piece, and moves the gear mechanism that enables opening and closing of the front propeller (3) and rear propeller (4) wings, that are in contact with the conic cam (21) and has balls at its end to enable movement, a cam follower shaft (23) which is supported to move linearly in the conic cam follower (22), advances upward as the conic cam follower (22) moves towards the greater diameter on the conic cam (21), and acts downward towards the part of the conic cam (21) with smaller diameter, and which is connected to the conic cam follower (22), and which is supported so as to allow for the linear movement to the cogwheel of the rack geartrain (19) connected to the front propeller (3), cam follower gear (24) in the form of a cogwheel connected to the cam follower shaft (23) which rotates the propeller closing gear (25) and acts linearly together with the cam follower shaft (23), a propeller closing gear (25) which enables turning off the front propeller (3) and rear propeller (4) when they are not in use, and turning them on when they are to be used, which rotates with the upward and downward movement of the cam follower gear (24) on the diameter created by the by the axial offset.

a rack linear actuator (26) connected to the body, which drives the mechanism that provides the pitch control of the front propeller (3) and the rear propeller (4), transmits linear movement from the inside of the internal combustion engine (15) output shaft to the rack power transmission hub (18), and a hollow cylindrical shaft connected to the body (1) through the hub, a conic cam linear actuator (27) connected to the body (1), which drives linearly the conic cam (21) element, and provides this movement with a different shaft passing through the inner side of the hollow internal combustion engine's (15) output shaft.

The front propeller (3) and rear propeller (4) on the body (1) are pitch-controlled. In other words, pitch angles can be changed.

The front propeller (3) operates during vertical take-off and landing of the unmanned aerial vehicle. Furthermore, in the high altitude model, it can also be operated at the higher layers of the atmosphere.

The front propeller (3) is larger than the rear propeller (4) in width (X:1 ratio) and in length (Y:1 ratio). (X and Y are numbers greater than 1)

During lateral constant flight or gliding of the unmanned aerial vehicle, in order to reduce the resistance of air which occurs during the operation of the front propeller (3), the angle of each one of the front propellers (3) is turned in flight direction ideally by 90 degrees but practically at the maximum angle that is allowed by the geometry the front propeller (3) is dependent on and by the pitch control. In other words, the sharp edges of the front propeller (3) look forward as much as possible. This movement is provided with the pitch control mechanism.

On the unmanned aerial vehicle, when the front propeller (3) is not turning, it remains folded downward with gravity as much as the mechanical limits allow for that. However, when the front propeller (3) begins turning, it takes its normal position with centrifugal effect.

The invention is an unmanned aerial vehicle which comprises a load balancing mechanism (37) which includes;

an inner cylinder (29) which constitutes the inner portion of the mechanism and has linear slide bearings (28) and which is located on the liquid hydrogen tank (6), an outer cylinder which acts on the inner cylinder (29) and helps changing the position of the center of gravity, acts on the inner cylinder to shift the center of gravity towards the front side of the vehicle and approaches the body (1) and moves away from it in a completely reverse situation, DC motor (32) which is fixed with the engine arrester (31) to the outer cylinder (30) and drives the screw shaft (34) and determines the reciprocal position of the inner cylinder (29) and the outer cylinder (30), a coupler (33) which minimizes radial space and transmits torque between the DC motor (32) and the screw shaft (34), screw shaft nut (35) which enables translating the movement of the rotationally moving screw shaft (34) to linear movement, a screw shaft nut socket (36) which bares the screw shaft nut (35) in the inner cylinder (29).

In the load balancing mechanism (37), DC motor (32) is connected to the screw shaft (34) by means of a coupler (33). A screw shaft nut (35) and a screw shaft nut socket (36) is provided at the end of said screw shaft (34). The DC motor (32) is fixed on the outer cylinder (30). The screw shaft socket (36) is fixed on the inner cylinder (29). The concentric inner cylinder (29) and the outer cylinder (30) are connected to each other with linear slide bearings (28), thus reciprocal rotation of the inner cylinder (29) and the outer cylinder is avoided.

On the load balancing mechanism (37), when the DC motor (32) rotates the screw shaft (34), the rotational movement of the screw shaft nut (35) transforms rotational movement to linear movement; as a result, the inner cylinder (29) and the outer cylinder (30) move on the linear slide bearings (28).

The invention is an unmanned aerial vehicle which comprises;

a high pressure leak-proof hydrogen input valve (39) fixed to the notch carved at the end of the helical coiled tube (43), which stores hydrogen cryogenically in liquid form at low temperatures and high pressure, provides hydrogen supply as fuel to the internal combustion engine (15), and enables liquid hydrogen feeding from the hydrogen fuel tube (38), a high pressure leak-proof hydrogen output valve (40) fixed with a notch opened at the end of the helical coiled tube (43), and through which the hydrogen transforms from liquid to gas form to become a fuel-air mixture, high pressure leak-proof oil inlet valve (41) fixed in the internal combustion engine (15) with a screw on the heat exchanger (44), where the oil that reaches high temperature enters, a high pressure leak-proof oil output valve (42) that is fixed with a screw onto the heat exchanger (44) where the high temperature lubricant enters through the engine oil input valve (41) and transfers its heat to the liquid hydrogen and which then exits as cooled oil and is then returned to circulation to re-lubricate the internal combustion engine (15), a helical coiled tube (43) which enables the exchanging of heat between the hydrogen and the lubricant having a high temperature, where said tube's surface area is high, and which consists of a leak-proof tube welded in a coiled form in the heat exchanger (44), heat exchanger (44) in the form of a hollow cylinder that is connected to the body (1) inside the engine assembly.

Hydrogen as the fuel of the internal combustion engine (15) is stored in a hydrogen fuel tank (38) which can cryogenically resist high pressure in liquid form. Heat exchange occurs between the lubricant at high temperatures in liquid form, which assists reducing the friction force during the movement of the radial pistons in the internal combustion engine (15) by means of a heat exchanger (44) before taking the form of an air-fuel mixture, and the hydrogen in liquid form at low temperature. The temperature of the lubricant at high temperature decreases while the hydrogen gasifies with the heat of the lubricant. The heat exchanger (44) used here is in a tube-like form which enables the flow of hydrogen, and has a coil form in which the lubricant travels spirally.

The invention is an unmanned aerial vehicle which comprises balloons (7) compressed and piled successively under the balloon covers (45) to be opened when the balloons (7) are to be activated. The invented unmanned aerial vehicle comprises a supercharger (46) connected to the body (1) on the engine assembly (2) and which enables the internal combustion engine (15) to have sufficient air-fuel mixture while working at high altitude, thus which compresses and accelerates the intake air to mix it in the hydrogen, a main drive shaft (50) in cylindrical form having a cogwheel at the ends installed such that it allows radial movement of the supercharger (46) and drives the supercharger transmission gears (51) that move the two-lobe rotary piston (47), three-lobe rotary piston (48) and four-lobe rotary piston (49) located in the supercharger (46), air inlet orifice (52) having a notch on the supercharger (46), which allows the air received from the outside to enter the first chamber to be compressed inside the supercharger (46), supercharger transfer gears (51) which is formed of a cogwheel coupled to the piston drive shaft (54) and which is placed in a manner to allow different rotational directions but with same rotation speed, which is driven by the main drive shaft (50), and moves the two-lobe rotary piston (47), three-lobe rotary piston (48) and four-lobe rotary piston (49), an air discharge orifice (53) which a notch on the supercharger (46), where the air compressed in the last compression chamber of the supercharger (46) is released with the highest compression rate and discharged to be mixed with the hydrogen fuel, a piston drive shaft (54) in the form of a cylindrical shaft which is mounted to allow its radial movement into the supercharger (46), and which rotates the elements that conduct the compression function together with itself, and to which torque is transmitted from the main drive shaft (50) via the transmission gears (51), a four-lobe rotary piston (49) connected to the piston drive shaft (54) which consists of four lobes in the chamber at the highest layer, which has the highest air pressure in the supercharger (46), a three-lobe rotary piston (48) connected to the piston drive shaft (54) which consists of three lobes in the chamber at the second layer in the supercharger (46), a two-lobe rotary piston (47) connected to the piston drive shaft (54) which comprises two lobes at the inlet layer of the supercharger (46), an air passage opening (55) with a certain diameter on the chambers along the same axis in the supercharger (46), through which the air passes in the direction at which the compression rate increases among the chambers where the air is compressed; the air compressed in the first chamber is urged to go to the second chamber by means of the two-lobe rotary pistons (47), and similarly, the air passes to the third chamber with four-lobe rotary pistons (49).

What is claimed is:

1. An autonomous unmanned aerial vehicle comprising:
an engine assembly, wherein the engine assembly is located in a body, and the engine assembly provides motion to a front propeller and a rear propeller,
the front propeller, wherein the front propeller is located in a front of the body, wherein the front of the body is connected to the engine assembly,
the rear propeller, wherein the rear propeller is connected to the engine assembly and the rear propeller is located at a rear of the body, the rear propeller is configured to rotate in a same direction or opposite direction to the front propeller,
3 wings, wherein the 3 wings enable vertical take-off and vertical landing of the autonomous unmanned aerial vehicle, a plurality of sharp ends of the 3 wings are used as a landing gear, and the landing gear are installed on the body with constant 120 degree spacing,
a liquid hydrogen tank installed in a center of the rear propeller,
a balloon is wrapped around the liquid hydrogen tank, wherein the balloon is inflated with hydrogen in the liquid hydrogen tank, and the balloon enables suspension of the autonomous unmanned aerial vehicle in air,
a multispectral camera, wherein the multispectral camera is installed in a center of the front propeller, and
a stabilized platform, wherein the stabilized platform carries the multispectral camera.

2. The autonomous unmanned aerial vehicle according to claim 1, further comprising a balloon ejection unit, wherein the balloon ejection unit is located at an end portion of the liquid hydrogen tank, wherein the balloon ejection unit releases the balloon during the vertical landing of the autonomous unmanned aerial vehicle.

3. The autonomous unmanned aerial vehicle according to claim 2, further comprising a mono block hybrid engine, wherein the mono block hybrid engine operates the engine assembly with an internal combustion engine during a lift off and when the autonomous unmanned aerial vehicle is operated in a friendly zone, and the mono block hybrid engine operates with electricity without noise in a mission area.

4. The autonomous unmanned aerial vehicle according to claim 3, wherein the autonomous unmanned aerial vehicle comprises a wing body, wherein the wing body is mounted on the body with constant 120 degree spacing.

5. The autonomous unmanned aerial vehicle according to claim 4, wherein the autonomous unmanned aerial vehicle comprises a wing end, wherein the wing end is mounted on an end portion of the wing body, and, the wing end is positioned in a same direction as the wing body when the autonomous unmanned aerial vehicle is taking off and when the unmanned aerial vehicle is gaining altitude, the wing end expands when the autonomous unmanned aerial vehicle is gliding wherein the wing end turns 180° in an opposite direction as the wing body to increase a gliding capacity of the autonomous unmanned aerial vehicle.

6. The autonomous unmanned aerial vehicle according to claim 5, wherein the autonomous unmanned aerial vehicle comprises a gyro unit attached to the front propeller, wherein the gyro unit provides reference to an inertial navigational system of the autonomous unmanned aerial vehicle, and the gyro unit enables correct positioning of the autonomous unmanned aerial vehicle and an autonomous flight of the autonomous unmanned aerial vehicle.

7. The autonomous unmanned aerial vehicle according to claim 6, wherein the autonomous unmanned aerial vehicle comprises a plurality of MEMPS microphones located on the autonomous unmanned aerial vehicle to eliminate and/or reduce a noise of the engine assembly by an acoustic interference method as the rear propeller rotates with a same rotation speed as the front propeller with 180 degrees phase so as to create a different noise.

8. The autonomous unmanned aerial vehicle according to claim 7, wherein the autonomous unmanned aerial vehicle operates as follows,
the autonomous unmanned aerial vehicle is operated with a remote control or the autonomous unmanned aerial vehicle is operated autonomously,
the autonomous unmanned aerial vehicle takes off by the internal combustion engine, wherein the internal combustion engine is located in the engine assembly,
a plurality of ends of the wing ends are opened 20-60° and the autonomous unmanned aerial vehicle takes off while working with an electric engine,
the wing ends extend 180° in a lateral axis while the autonomous unmanned aerial vehicle continues to operate with the electric engine, after reaching a target point, the wing ends are retracted and the autonomous unmanned aerial vehicle is reversed, the balloon is inflated with hydrogen wherein hydrogen is stored in the liquid hydrogen tank, the autonomous unmanned aerial vehicle ascends together with the balloon, wherein the balloon is inflated with hydrogen, the balloon is ejected after the autonomous unmanned aerial vehicle rises to an altitude wherein a sound of the internal combustion engine in the engine assembly is not heard, the internal combustion engine is operated and the autonomous unmanned aerial vehicle is returned back to an original location of the autonomous unmanned aerial vehicle.

9. The autonomous unmanned aerial vehicle according to claim 8, further comprising the liquid hydrogen tank, wherein hydrogen in the liquid hydrogen tank explodes as a bomb in an event of an attack or a danger.

10. The autonomous unmanned aerial vehicle according to claim 9, further comprising, a hollow cylindrical power transmission shaft connected at a hub of an internal combustion engine output shaft and a plurality of rotary body bearings in the engine assembly of the body, a control rack, wherein the control rack comprises three non-hollow cylindrical shafts born linearly on the plurality of rotary body bearings, wherein the plurality of rotary body bearings are connected to a rack power transmission hub, the rack power transmission hub in a cylindrical form, wherein the cylindrical form of the rack power transmission hub is operated in a manner to allow a radial movement in the engine assembly, wherein the rack power transmission hub is in a form of a disk connected with the hollow cylindrical power transmission shaft to a rack linear actuator, a rack gear train, wherein the rack gear train comprises 3 rack gears on the shaft connected to 3 control racks, and 3 cogwheels, wherein the 3 control racks and the 3 cogwheels are connected to the front propeller and the 3 control racks are positioned to act together with the 3 cogwheels, the plurality of rotary body bearings are mounted to the engine assembly to allow a radial movement of the plurality of rotary body bearings and the engine assembly, a conic cam in a form of the hollow cylindrical power transmission shaft having the conic cam at an end portion of the hollow cylindrical power transmission shaft, wherein the conic cam is mounted to allow for a linear movement relative to the engine assembly, and the conic cam and the engine assembly are connected to the plurality of rotary body bearings so as to rotate together with the plurality of rotary body bearings, a conic cam follower, wherein the conic cam follower contacts the conic cam and the conic cam follower has a moveable ball at an end of the conic cam follower to enable movement, a cam follower shaft as a cylindrical shaft mounted linearly moveable to a cogwheel of the rack gear train, wherein the cogwheel of the rack gear train is connected to the front propeller and the cam follower shaft in turn is connected to the conic cam follower, a cam follower gear in the form of a cogwheel connected to the cam follower shaft, a propeller closing gear is placed as axially offset compared to the rack follower gear, wherein the propeller closing gear is connected to the front propeller, a rack linear actuator connected to the body, wherein the rack linear actuator has a hollow cylindrical output shaft connected through a hub of the rack power transmission hub, a conic cam linear actuator is connected to the body, wherein the conic cam linear actuator has a cylindrical output shaft connected through a hub to the conic cam.

11. The autonomous unmanned aerial vehicle according to claim 10, wherein the autonomous unmanned aerial vehicle comprises an inner cylinder, wherein the inner cylinder constitutes an inner portion of a mechanism and has a plurality of linear slide bearings and the inner cylinder is located on the liquid hydrogen tank, an outer cylinder, wherein the outer cylinder acts on the inner cylinder and enables to change a position of the center of gravity, and moves towards the body by moving on the inner cylinder in order to shift the center of gravity towards a front section of the autonomous unmanned aerial vehicle and moves away from the body in order to shift the center of gravity back, a DC engine, wherein the DC engine is fixed with an engine arrester to the outer cylinder and drives a screw shaft and determines a position of the inner cylinder and the outer cylinder relative to each other, a coupler, wherein the coupler minimizes a radial space and transmits a torque between the DC motor and the screw shaft, a screw shaft nut, wherein the screw shaft nut enables translating a movement of a rotationally moving screw shaft into linear movement, a screw shaft nut socket having a screw shaft nut mounted into the inner cylinder, wherein the screw shaft nut socket comprises a load balancing mechanism.

12. The autonomous unmanned aerial vehicle according to claim 11, wherein the autonomous unmanned aerial vehicle comprises a heat exchanger in a form of a hollow cylinder connected to the body in the engine assembly, a helical coiled tube comprising a welded leak-proof tube in a helical form inside the heat exchanger, a high pressure leak-proof hydrogen input valve fixed to a notch opened at an end of the helical coiled tube, a high pressure leak-proof hydrogen output valve fixed to the notch opened at the end of the helical coiled tube, an oil input valve, wherein the oil input valve is leak-proof at high pressures and the oil input valve is fixed with a screw onto the heat exchanger, an oil output valve, wherein the oil output valve is leak-proof at high pressures and the oil output valve is fixed with the screw onto the heat exchanger.

13. The autonomous unmanned aerial vehicle according to claim 12, wherein the autonomous unmanned aerial vehicle comprises a plurality of balloon covers wherein the plurality of balloon covers are opened when the balloons are to be activated, wherein the plurality of balloon covers are located between the balloons, wherein the balloons have been compressed and folded and successively stacked.

14. The autonomous unmanned aerial vehicle according to claim 13, wherein the autonomous unmanned aerial vehicle comprises a supercharger connected to the body in the engine assembly, a cylindrical main drive shaft with a cogwheel at the ends of the cylindrical main drive shaft, wherein the cogwheel at the ends of the cylindrical main drive shaft is mounted to the supercharger, to allow a radial movement of the cylindrical main drive shaft, an air inlet orifice with an opened notch located on the supercharger, a supercharger transmission gears formed of a cogwheel coupled to a piston drive shaft, an air outlet orifice with an opened notch located on the supercharger, the piston drive shaft in the form of the cylindrical shaft attached to the supercharger to move in a radial motion, a four-lobe rotary piston connected to the piston drive shaft, wherein the four-lobe rotary piston consists of four lobes in a chamber at a highest layer, wherein the highest layer has the highest air pressure in the supercharger, a three-lobe rotary piston connected to the piston drive shaft, wherein the three-lobe rotary piston consists of three lobes in a chamber at a second layer in the supercharger, a two-lobe rotary piston connected to the piston drive shaft, wherein the two-lobe rotary piston consists of two lobes in a chamber at an entrance layer in the supercharger, an air passage opening having a certain diameter located on a plurality of chambers along a same axis in the supercharger.

15. The autonomous unmanned aerial vehicle according to claim 14, wherein the autonomous unmanned aerial vehicle maintains a position of the autonomous unmanned aerial vehicle under a plurality of light wind conditions during an operation of the autonomous unmanned aerial vehicle when the autonomous unmanned aerial vehicle is suspended in air by the balloon, by running the rear propellers with electricity and by activating a plurality of stabilizers.

16. The autonomous unmanned aerial vehicle according to claim 15, wherein the autonomous unmanned aerial vehicle lands and takes off on rough terrain and water and operates in a limited range on the rough terrain in cases of emergency, extreme wind or bad weather conditions and/or when required by the mission.

\* \* \* \* \*